United States Patent
Goldman et al.

(10) Patent No.: US 8,639,383 B2
(45) Date of Patent: Jan. 28, 2014

(54) AUTOMATED RESEARCH PLANTING SYSTEM, METHOD, AND APPARATUS

(75) Inventors: Daniel M. Goldman, Des Moines, IA (US); James L. Hunter, Littleton, CO (US); David L. Johnson, Johnston, IA (US); Timothy P. Meyer, Des Moines, IA (US); Lyndon J. Schroeder, Urbandale, IA (US); Timothy J. Wilhelm, Des Moines, IA (US)

(73) Assignee: Pioneer Hi Bred International Inc, Johnston, IA (US)

( * ) Notice: Subject to any disclaimer, the term of this patent is extended or adjusted under 35 U.S.C. 154(b) by 1033 days.

(21) Appl. No.: 12/558,062

(22) Filed: Sep. 11, 2009

(65) Prior Publication Data

US 2010/0070072 A1 Mar. 18, 2010

Related U.S. Application Data

(60) Provisional application No. 61/097,334, filed on Sep. 16, 2008, provisional application No. 61/098,393, filed on Sep. 19, 2008.

(51) Int. Cl.
*G06F 7/00* (2006.01)

(52) U.S. Cl.
USPC .......................................................... 700/219

(58) Field of Classification Search
USPC .......................................................... 700/219
See application file for complete search history.

(56) References Cited

U.S. PATENT DOCUMENTS

| | | |
|---|---|---|
| 3,443,720 A | 5/1969 | Al-Roy |
| 4,792,085 A | 12/1988 | Waring, III et al. |
| 4,892,220 A | 1/1990 | Foos |
| 5,221,040 A | 6/1993 | Sorenson |
| 5,332,147 A | 7/1994 | Sorenson |
| 5,388,758 A | 2/1995 | Scovell |
| 5,646,846 A | 7/1997 | Bruce et al. |
| 5,913,915 A * | 6/1999 | McQuinn ........................ 701/50 |
| 5,955,973 A | 9/1999 | Anderson |
| 6,089,743 A | 7/2000 | McQuinn |

(Continued)

FOREIGN PATENT DOCUMENTS

| | | |
|---|---|---|
| AT | 312 535 | 1/1974 |
| CH | 393 179 | 10/1965 |

(Continued)

OTHER PUBLICATIONS

International Search Report for corresponding International Application No. PCT/US2009/056652.

(Continued)

*Primary Examiner* — Ramya Burgess
(74) *Attorney, Agent, or Firm* — Pioneer Hi-Bred International, Inc.

(57) ABSTRACT

The present invention provides an automated research seed planting system, method, and apparatus. The system, method, and apparatus may include a planter configured for planting a research plot and comprising a seed package assembly handling device configured to receive a seed package assembly containing a research seed sample, and a controller configured to communicate with the seed package assembly handling device. The controller is configured to automatically control the seed package assembly handling device to release the research seed sample. In various embodiments, the research seed planter may include a positional data acquisition system configured to acquire position data associated with one or more research seed planting events.

55 Claims, 15 Drawing Sheets

(56) References Cited

U.S. PATENT DOCUMENTS

| | | | |
|---|---|---|---|
| 6,122,581 A | 9/2000 | McQuinn | |
| 6,199,000 B1 | 3/2001 | Keller et al. | |
| 6,230,091 B1 * | 5/2001 | McQuinn | 701/50 |
| 6,349,875 B1 | 2/2002 | Whitnell | |
| 6,386,128 B1 | 5/2002 | Svoboda et al. | |
| 6,474,500 B1 | 11/2002 | Carr et al. | |
| 6,505,124 B2 | 1/2003 | Carr et al. | |
| 6,505,146 B1 | 1/2003 | Blackmer | |
| 6,510,367 B1 | 1/2003 | McQuinn | |
| 6,516,271 B2 | 2/2003 | Upadhyaya et al. | |
| 6,516,733 B1 | 2/2003 | Sauder et al. | |
| 6,553,299 B1 | 4/2003 | Keller et al. | |
| 6,553,312 B2 | 4/2003 | Upadhyaya et al. | |
| 6,671,698 B2 | 12/2003 | Pickett et al. | |
| 6,672,228 B1 | 1/2004 | Groelz et al. | |
| 6,706,989 B2 | 3/2004 | Hunter et al. | |
| 6,760,654 B2 | 7/2004 | Beck | |
| 6,810,315 B2 | 10/2004 | Cessac | |
| 6,832,567 B2 | 12/2004 | Carr et al. | |
| 6,941,225 B2 | 9/2005 | Upadhyaya et al. | |
| 6,997,120 B2 | 2/2006 | Gabriel | |
| 7,111,567 B2 | 9/2006 | Carr et al. | |
| 7,197,992 B2 | 4/2007 | Gabriel | |
| 7,472,659 B2 | 1/2009 | Gabriel | |
| 7,509,199 B2 | 3/2009 | Rekow | |
| 7,610,122 B2 * | 10/2009 | Anderson | 701/2 |
| 7,673,572 B2 | 3/2010 | Deppermann et al. | |
| 7,775,167 B2 | 8/2010 | Stehling et al. | |
| 2003/0187560 A1 | 10/2003 | Keller et al. | |
| 2004/0148057 A1 * | 7/2004 | Breed et al. | 700/242 |
| 2006/0124643 A1 | 6/2006 | Markert et al. | |
| 2006/0278143 A1 | 12/2006 | Deppermann et al. | |
| 2008/0006627 A1 | 1/2008 | Goldman et al. | |
| 2008/0009962 A1 * | 1/2008 | Hood et al. | 700/213 |
| 2009/0010750 A1 | 1/2009 | Goldman et al. | |

FOREIGN PATENT DOCUMENTS

| | | |
|---|---|---|
| DE | 33 45 565 | 6/1985 |
| DE | 44 19 475 | 12/1995 |
| FR | 1 074 246 | 10/1954 |
| FR | 2 736 333 | 1/1997 |
| GB | 20118 | 8/1913 |
| GB | 2 367 814 | 4/2002 |
| WO | WO 93/25444 | 12/1993 |
| WO | WO 2004/048200 | 6/2004 |
| WO | WO 2008/006063 | 1/2008 |
| WO | WO 2008/024760 | 2/2008 |

OTHER PUBLICATIONS

Written Opinion of the International Searching Authority for corresponding International Application No. PCT/SU2009/056652.
Almaco Planter Options (2 pgs.) http:www.almaco.com/products/productDetail.cfm?ProductID=60 cite visited Sep. 11, 2009.

* cited by examiner

AUTOMATED RESEARCH PLANTING SYSTEM, METHOD, AND APPARATUS

CROSS REFERENCE TO RELATED APPLICATIONS

The present application claims priority from U.S. Provisional Application No. 61/097,334, filed on Sep. 16, 2008 and U.S. Provisional Application No. 61/098,393, filed on Sep. 19, 2008, both of which are hereby incorporated herein in their entirety by reference.

FIELD OF THE INVENTION

The various embodiments of the present invention relate generally to an automated system, method, and apparatus for preparing an agricultural research plot. More specifically, embodiments of the present invention provide an automated system, method, and apparatus for dispensing seed samples into an agricultural research plot and for managing information relating to the dispensing of the seed samples.

BACKGROUND OF THE INVENTION

It is typical for a company in the agricultural seed industry to generate one or more research plots in order to evaluate certain seed varieties. Such seed varieties may include, but need not be limited to, seeds from a specific source, genotype, population, and/or breeding line. In such a manner, researchers may evaluate characteristics of the plants growing in the research plot, as well as characteristics of any crops produced from the plants. In some instances these characteristics may be compared to plants grown from different seed varieties in the research plot. Thus, certain experiments may require a researcher to plant many different seed varieties in the research plot at approximately the same time. Additionally, a researcher may desire to plant various seed varieties in relatively close proximity to other seed varieties.

Traditional research plot planting is a largely manual process. Conventional techniques require seed samples to be packaged in small paper coin envelopes, which are manually opened at the desired planting locations in order to deposit the seed samples for planting research plots. In many instances this is accomplished by using a mobile planter transport device that transports a research seed planter configured to carry a seed planting operator. FIG. 1 shows a typical prior art research seed planter 10, configured to carry a seed planting operator to plant two rows of seed in a research plot. A similar research planter is available, for example, from ALMACO of Nevada, Iowa. The research seed planter 10 of FIG. 1 is configured to be pulled behind a mobile planter transport device, in this case a tractor operated by a tractor operator. As shown in the figure, the typical prior art research seed planter 10 includes a planting operator seat 12, a seed storage area 14, and one or more seed metering systems 18. In such a manner, a seed planting operator may ride along with the research seed planter 10 as the research seed planter 10 is pulled through the research plot. Seeds that are to be planted in the research plot are contained in coin envelopes that are stored in the seed storage area 14. As the research seed planting device is transported through the research plot, the seed planting operator accesses the coin envelopes and opens the envelopes into seed funnels 16 that deliver the seed to seed metering systems 18 for depositing the seeds into the research plot. In order to track the location of various seed varieties, a map may be manually created that describes the locations of the various seed varieties based on the planned distribution of seeds. In other applications, a map based on randomization of an experiment plan may be electronically generated based on the planned distribution of seeds. In either event, the map is generated before seeds are planted in the research plot and thus the map represents where the seeds are supposed to be planted in the research plot and not necessarily where the seeds are planted. This process is susceptible to various forms of error. For example, it requires that the seed planting operator identify the proper seed envelope and deposit the contents of the envelope into the proper seed funnel at the proper time and location. Although the research seed planter 10 shown in the figure carries a single operator for planting two rows of seed in a research plot, many research seed planters carry additional seed planting operators and are configured to plant several additional rows. With each additional operator, however, errors of the type discussed above are multiplied. For example, another common research seed planter carries four seed planting operators and is configured to plant eight rows of seed in a research plot, with each operator being responsible for planting two rows. However, each of the four operators may be capable of making the errors discussed above. Additionally, because the manual nature of these prior art processes, various errors are also introduced into the map of seed locations.

In a research setting, the ability to accurately, consistently, and predictably populate a research plot is very important. However, as noted above, conventional research planting procedures rely heavily on manual processes. Reliance on manual processes prevents conventional methods from quickly and accurately adapting to changes in research plans, which may describe a desired seed planting distribution within one or more research plots. Because conventional planting methods rely on records developed prior to planting the research plot to maintain the identification and traceability of planted seed samples, such reliance could introduce error that may be detrimental to the integrity of the results of experiments that rely on accurate research seed plot maps.

As a result, there is a need in the art for an automated research seed planting system and associated method. In various embodiments, the automated research seed planting system and method should significantly reduce the manual processes involved in planting a research plot. Additionally, the automated research seed planting system and method should improve the accuracy of the planting system such that characteristics of the research plot, such as the identity, location, and time that seeds were deposited into the research plot, are readily and accurately determined.

SUMMARY OF THE INVENTION

The present invention addresses the above needs and achieves other advantages by providing an automated research seed planting system, method, and apparatus. In general, the automated research seed planting system comprises a planter configured for planting a research plot and comprising a seed package assembly handling device configured to receive a seed package assembly containing a research seed sample, and a controller configured to communicate with the seed package assembly handling device. The controller is configured to control the seed package assembly handling device to automatically release the research seed sample from the seed package assembly. In some embodiments, the controller may be further configured to automatically control the seed package handling device to apply a force to the seed package assembly to release the research seed sample from the seed package assembly.

In some embodiments, the seed package assembly handling device may be configured to open a seed package assembly comprising first and second portions that cooperate to contain the research seed sample, and the seed package assembly handling device may be configured to apply a force to the seed package assembly so that the first and second portions of the seed package assembly at least partially separate thus releasing the research seed sample. In some embodiments, the controller may be configured to control the seed package assembly handling device to bypass releasing the research seed sample from the seed package assembly. In some embodiments, the controller may be configured to control the seed package assembly handling device according to one or more instruction sets. In some embodiments, one or more instructions sets may be derived from one or more research plans. In some embodiments, at least one of the research plans or the instruction sets may be stored in at least one data store. In some embodiments, the force may comprise at least a compressive force and the compressive force may cause at least one of the first or second portions of the seed package assembly to flex outwardly from the other portion about a flexure axis so that the first and second portions at least partially separate in response to the force, thus releasing the research seed sample.

In some embodiments, the seed package assembly handling device may further comprise an opening tool and a disengaging tool, and the controller may further be configured to cause the opening tool to contact between the first and second portions of the seed package assembly and to automatically control the seed package assembly handling device to apply a second force to the package assembly via the disengaging tool, for encouraging at least one of the first or second portions to flex outwardly from the other portion about the flexure axis so that the first and second portions separate. In some embodiments, the seed package assembly may include at least one of a machine-readable or human-readable label. Some embodiments may further comprise a seed package assembly sensor device configured for reading the label of the seed package assembly. In some embodiments, the seed package assembly sensor device may comprise a device selected from the group consisting of a bar code reader, an OCR reader, an RFID reader, and combinations thereof. In some embodiments, the planter may further comprise a seed metering device configured to receive the research seed sample from the seed package assembly handling device, and the seed metering device may be configured to separate individual seeds from the research seed sample and to release the individual seeds into the research plot. Some embodiments may further comprise a seed meter sensor device configured to sense individual seeds as the individual seeds are released into the research plot.

Some embodiments may further comprise a positional data acquisition device configured to acquire position data relating to a position of the released research seed sample. Some embodiments may further comprise a positional data acquisition device configured to acquire position data and wherein the controller may be configured to control the seed package assembly handling device according to the position data and one or more instruction sets. In some embodiments, the planter may comprise a plurality of seed package assembly handling devices each configured to receive a respective seed package assembly of a plurality of seed package assemblies, and one or more controllers may be configured to automatically control each seed package assembly handling device to release a respective research seed sample into the research plot. In some embodiments, the planter may further comprise a plurality of seed metering devices each configured to receive a respective research seed sample from a respective seed package assembly handling device, and each seed metering device may be further configured to separate individual seeds from the respective research seed sample and to release the individual seeds into the research plot. Some embodiments may further comprise a plurality of seed meter sensor devices configured to sense individual seeds as the individual seeds are released into the research plot. In some embodiments, the planter may be configured to plant four rows and may comprise four seed package assembly handling devices and four respective seed metering devices, and wherein each seed package assembly handling device may be configured to release at least a portion of a respective seed sample into a respective seed metering device. In some embodiments, the planter may be configured to plant eight rows and may comprise four seed package assembly handling devices, four seed sample splitting devices, and eight seed metering devices, and wherein each seed package assembly handling device may be configured to release at least a portion of a respective seed sample into a respective pair of the eight seed metering devices via a respective seed sample splitting device.

Another embodiment of the present invention provides a method of planting a research plot. In general, the method comprises transporting a planter that comprises a seed package assembly handling device and that receives a seed package assembly containing a research seed sample, and controlling the seed package assembly handling device using a controller to automatically release the research seed sample. Some embodiments may further comprise automatically controlling the seed package handling device to apply a force to the seed package assembly to release the research seed sample from the seed package assembly.

In some embodiments, the seed package assembly handling device may receive a seed package assembly comprising first and second portions that cooperate to contain the research seed sample and applying a force to the seed package assembly may cause the first and second portions of the seed package assembly to at least partially separate thus releasing the research seed sample. Some embodiments may further comprise controlling the seed package assembly handling device to bypass releasing the research seed sample from the seed package assembly. In some embodiments, the controller may be configured to control the seed package assembly handling device according to one or more instruction sets. In some embodiments, one or more instructions sets may be derived from one or more research plans. In some embodiments, at least one of the research plans or the instruction sets may be stored in at least one data store. In one embodiment, controlling the seed package assembly handling device may comprise controlling the seed package assembly handling device to automatically apply at least a compressive force to the seed package assembly and wherein the compressive force may cause at least one of the first or second portions of the seed package assembly to flex outwardly from the other portion about a flexure axis so that the first and second portions at least partially separate in response to the force, thus releasing the research seed sample.

Some embodiments may further comprise controlling the seed package assembly handling device using the controller to cause an opening tool to contact between the first and second portions of the seed package assembly and to apply a second force to the package assembly via a disengaging tool for encouraging at least one of the first or second portions to flex outwardly from the other portion about the flexure axis so that the first and second portions separate. Some embodiments may further comprise reading a label on the seed package assembly using a seed package assembly sensor device.

Some embodiments may further comprise using a seed metering device to receive the research seed sample from the seed package assembly handling device, separate individual seeds from the research seed sample, and release the individual seeds into the research plot. Some embodiments may further comprise sensing individual seeds using a seed meter sensor device as the individual seeds are released into the research plot. Some embodiments may further comprise using a positional data acquisition device to acquire position data relating to a position of the released research seed sample. In some embodiments, the planter may comprise a plurality of seed package assembly handling devices each configured to open a respective seed package assembly of a plurality of seed package assemblies, and controlling the seed package assembly handling device may comprise controlling each of the plurality of seed package assembly devices using one or more controllers release the respective research seed sample into the research plot. Some embodiments may further comprise using a plurality of respective seed metering devices to receive the respective research seed samples from the seed package assembly handling devices, separate individual seeds from the research seed samples, and release the individual seeds into the research plot.

Another embodiment of the present invention provides an automated research seed planting apparatus. In general, the automated research seed planting apparatus comprises a seed package assembly handling device configured to receive a seed package assembly containing a research seed sample and to automatically apply a force to the seed package assembly to release the research seed sample from the seed package assembly. In some embodiments, the seed package assembly handling device may be configured to open a seed package assembly comprising first and second portions that cooperate to contain the research seed sample, and the seed package assembly handling device may be configured to apply a force to the seed package assembly so that the first and second portions of the seed package assembly at least partially separate thus releasing the research seed sample. In some embodiments, the seed package assembly handling device may further comprise an opening tool configured to contact the seed package assembly between the first and second portions and the force may comprise a force exerted by the opening tool on the seed package assembly. In some embodiments, the force may comprise at least a compressive force and the compressive force may cause at least one of the first or second portions of the seed package assembly to flex outwardly from the other portion about a flexure axis so that the first and second portions at least partially separate in response to the force, thus releasing the research seed sample. In some embodiments, the seed package assembly handling device may be configured to bypass releasing the research seed sample from the seed package assembly. In some embodiments, the seed package assembly handling device may be controlled via a controller. In some embodiments, the seed package assembly handling device may be configured to be controlled according to one or more instruction sets. In some embodiments, the one or more instructions sets may be derived from one or more research plans. In some embodiments, at least one of the research plans or the instruction sets may be stored in at least one data store.

In some embodiments, the seed package assembly handling device may further comprise an opening tool and a disengaging tool, and the opening tool may be configured to contact the seed package assembly between the first and second portions of the seed package assembly so as to apply a second force to the seed package assembly and the disengaging tool may be configured to apply a third force to the seed package assembly, and the compressive force and the second and third forces may encourage at least one of the first or second portions to flex outwardly from the other portion about the flexure axis so that the first and second portions separate. Some embodiments may further comprise a seed package assembly sensor device configured for reading a label of the seed package assembly. In some embodiments, the seed package assembly sensor device may comprise a device selected from the group consisting of: a bar code reader, an OCR reader, an RFID reader, and combinations thereof. Some embodiments may further comprise a seed metering device configured to receive the research seed sample from the seed package assembly handling device, and wherein the seed metering device may be configured to separate individual seeds from the research seed sample and to release the individual seeds into the research plot. Some embodiments may further comprise a seed meter sensor device configured to sense individual seeds as the individual seeds are released into the research plot. Some embodiments may further comprise a positional data acquisition device configured to acquire position data relating to a position of the released research seed sample. Some embodiments may further comprise a positional data acquisition device configured to acquire position data and the seed package assembly handling device may be configured to operate according to the position data and one or more instruction sets. Some embodiments may further comprise a seed sample splitting device configured to receive the research seed sample from the seed package assembly handling device.

BRIEF DESCRIPTION OF THE DRAWINGS

Figure 1:
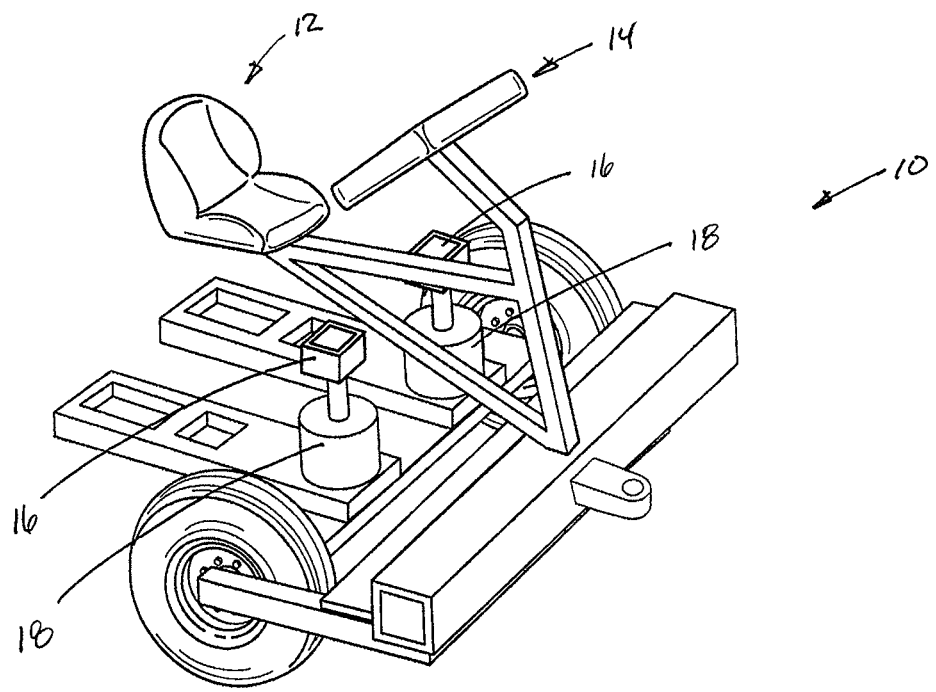
Figure 2:
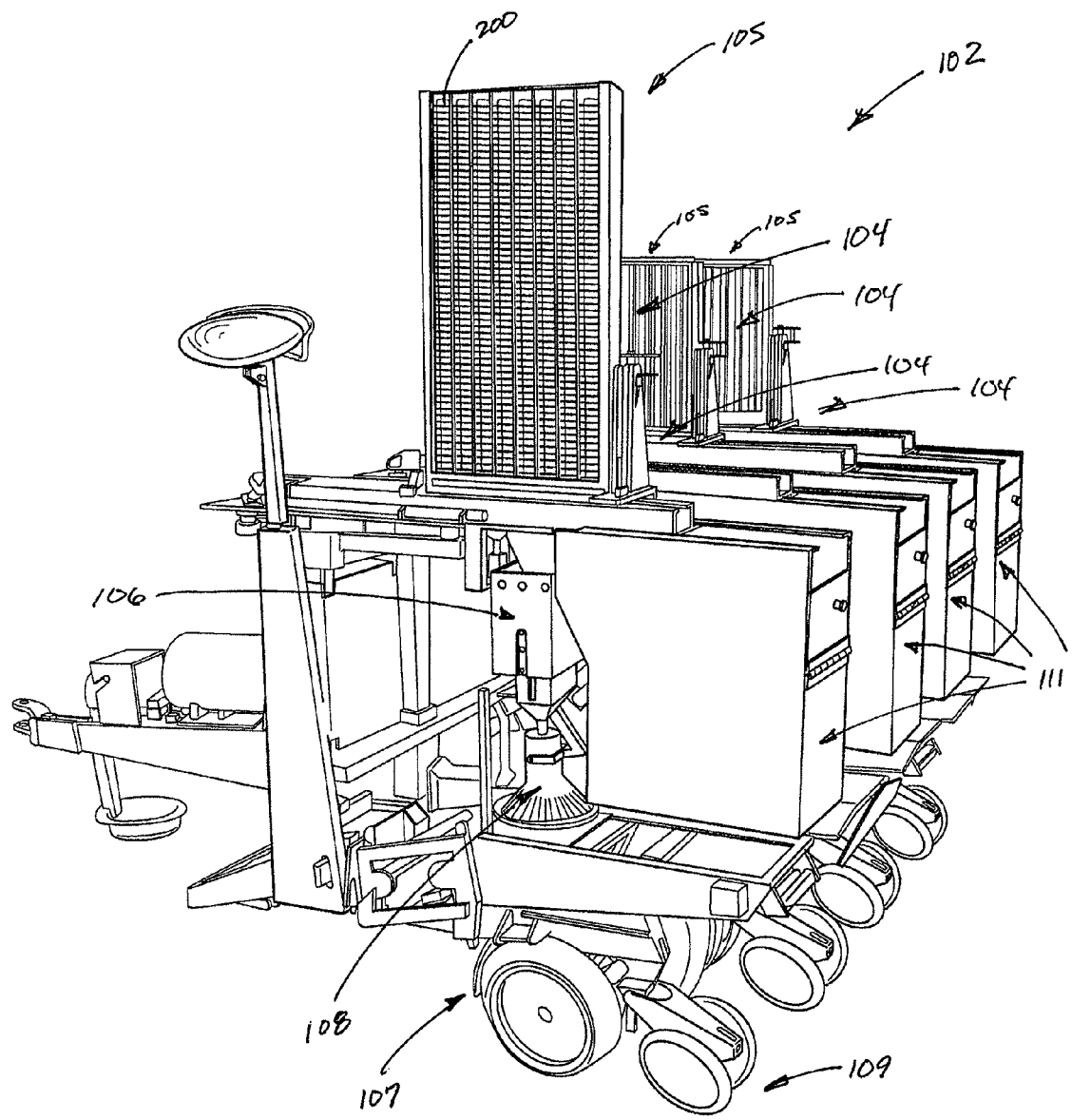
Figure 3:
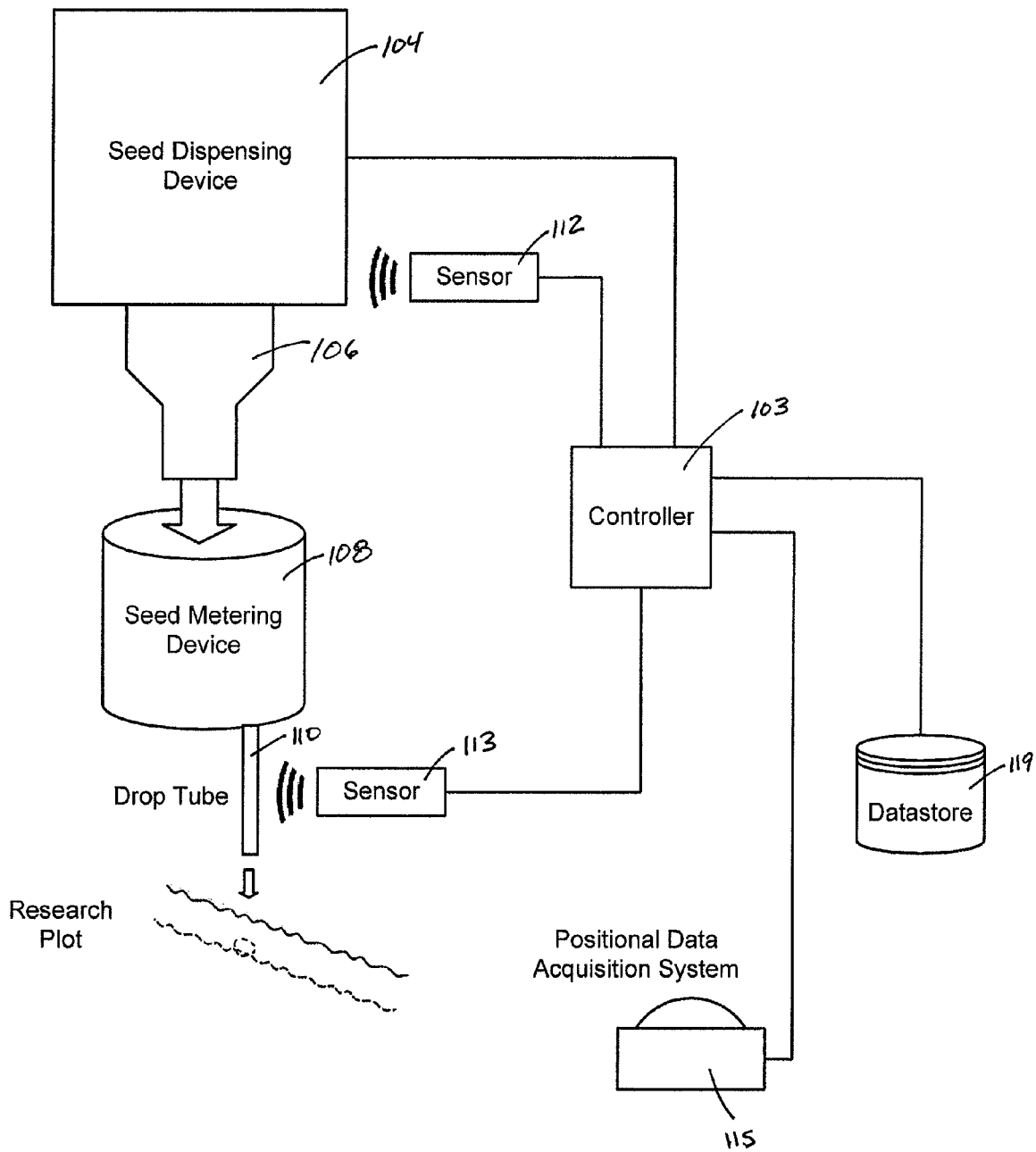
Figure 4:
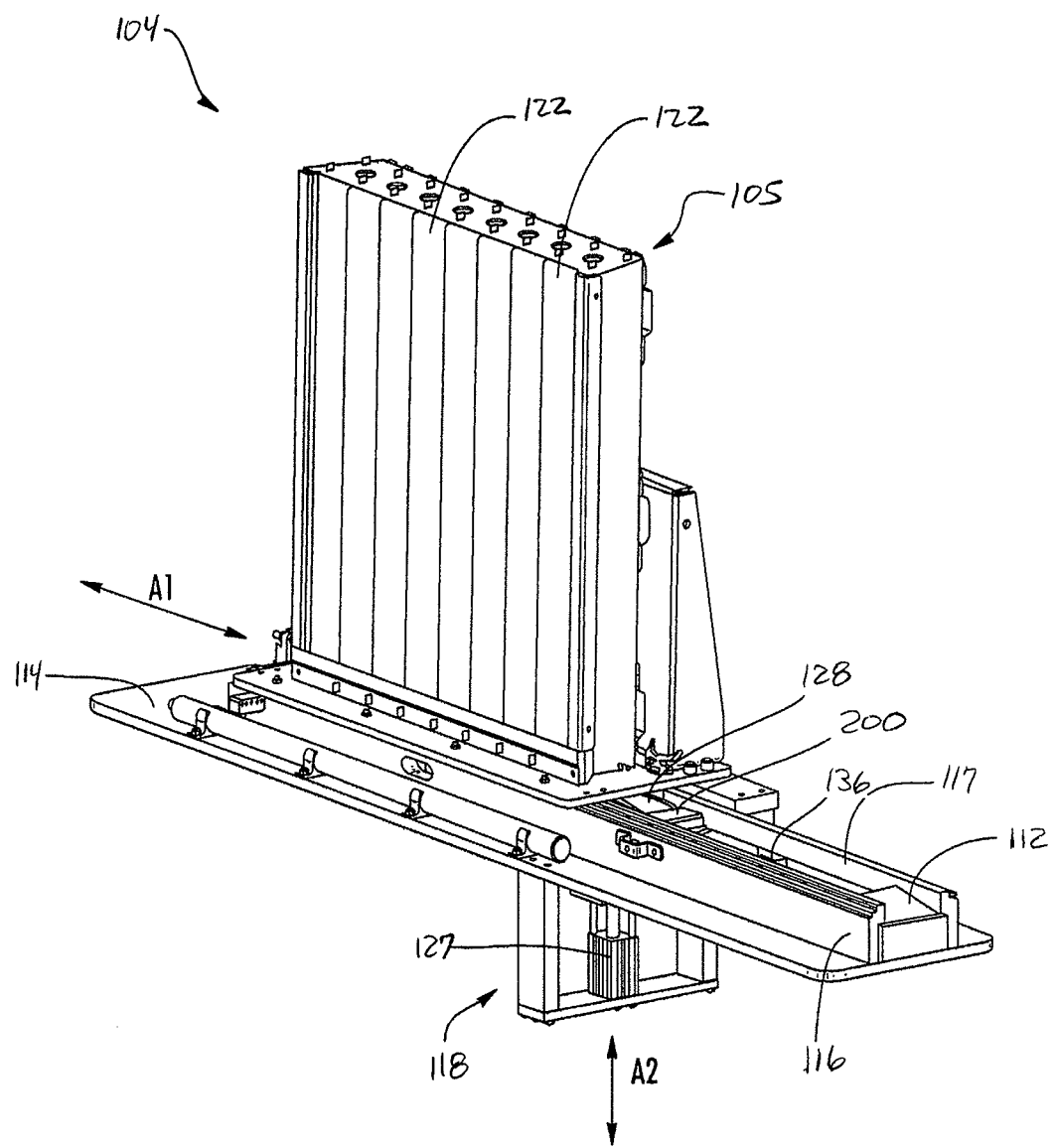
Figure 5:
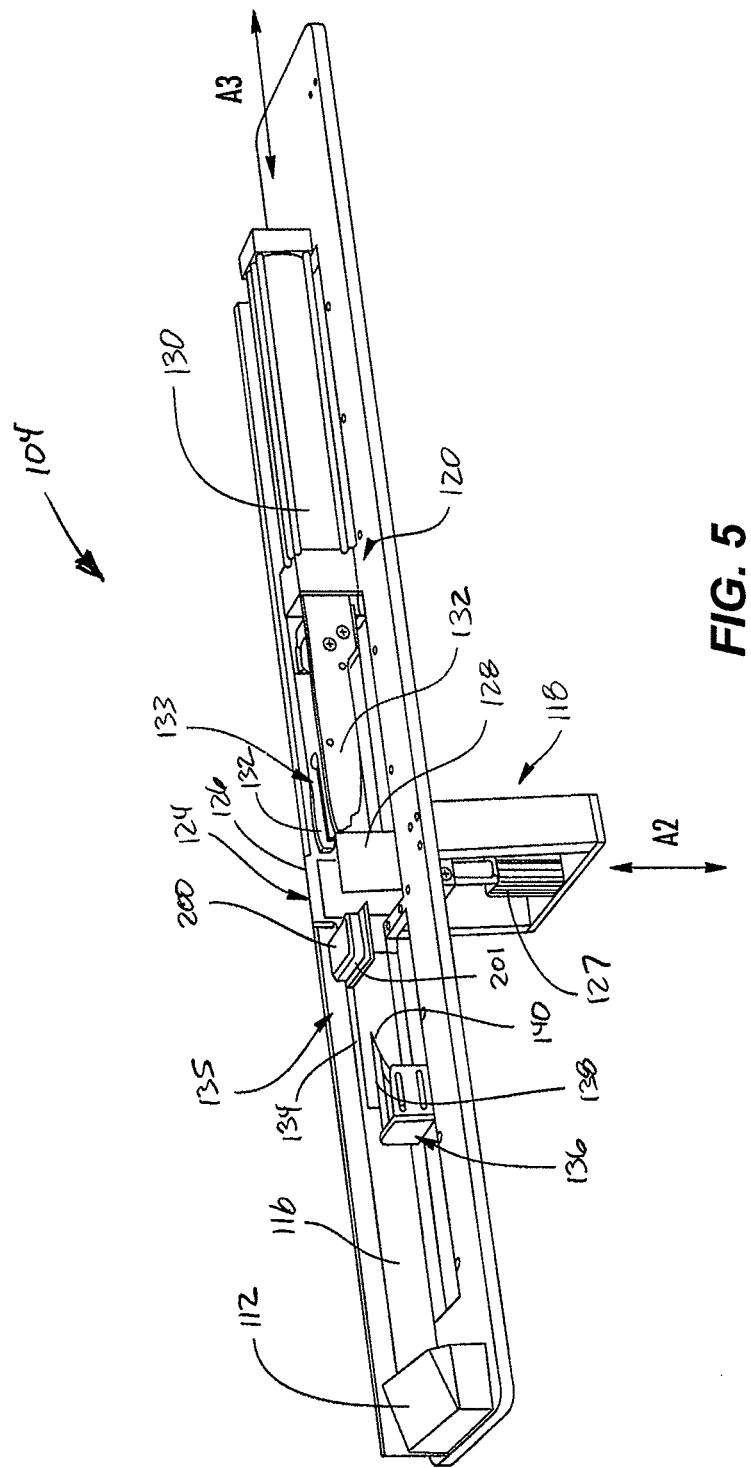
Figure 6:
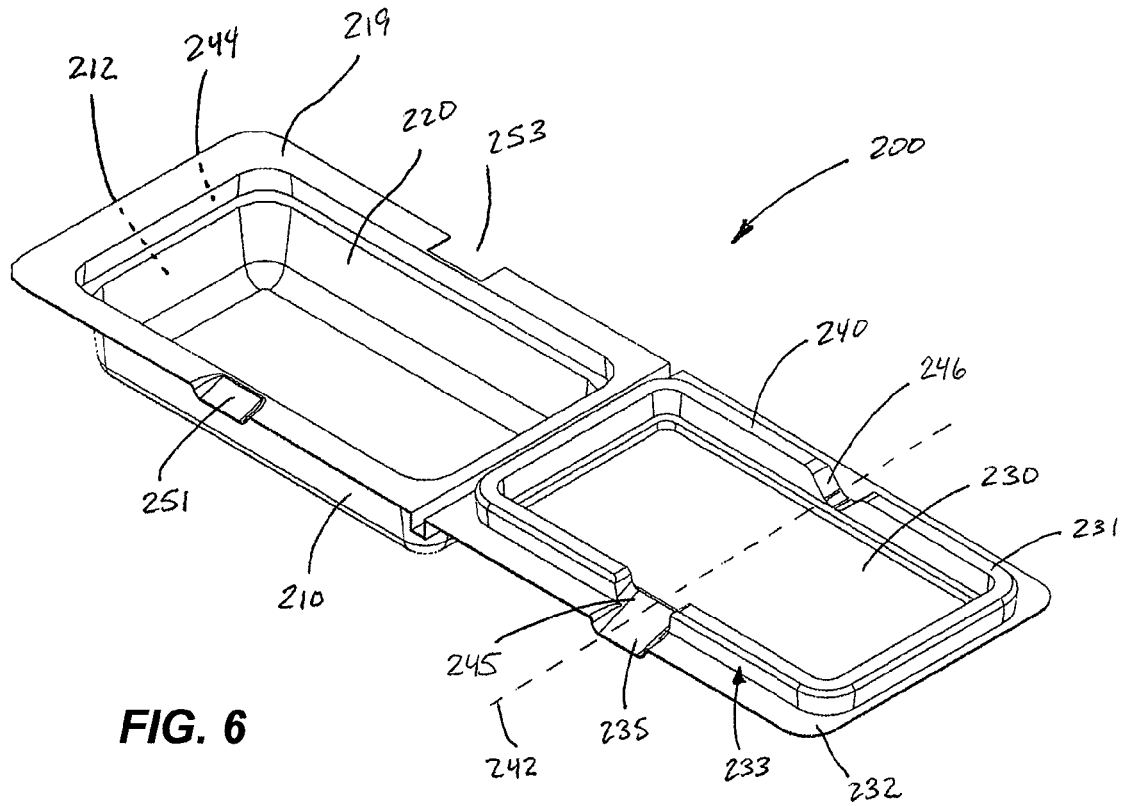
Figure 6A:
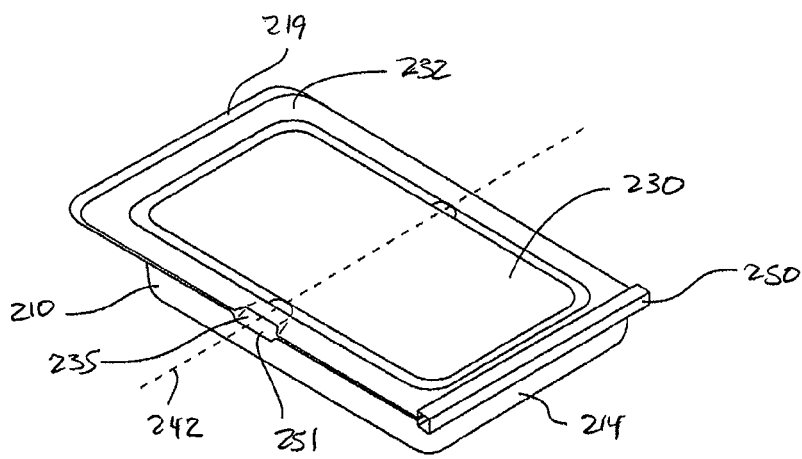
Figure 7:
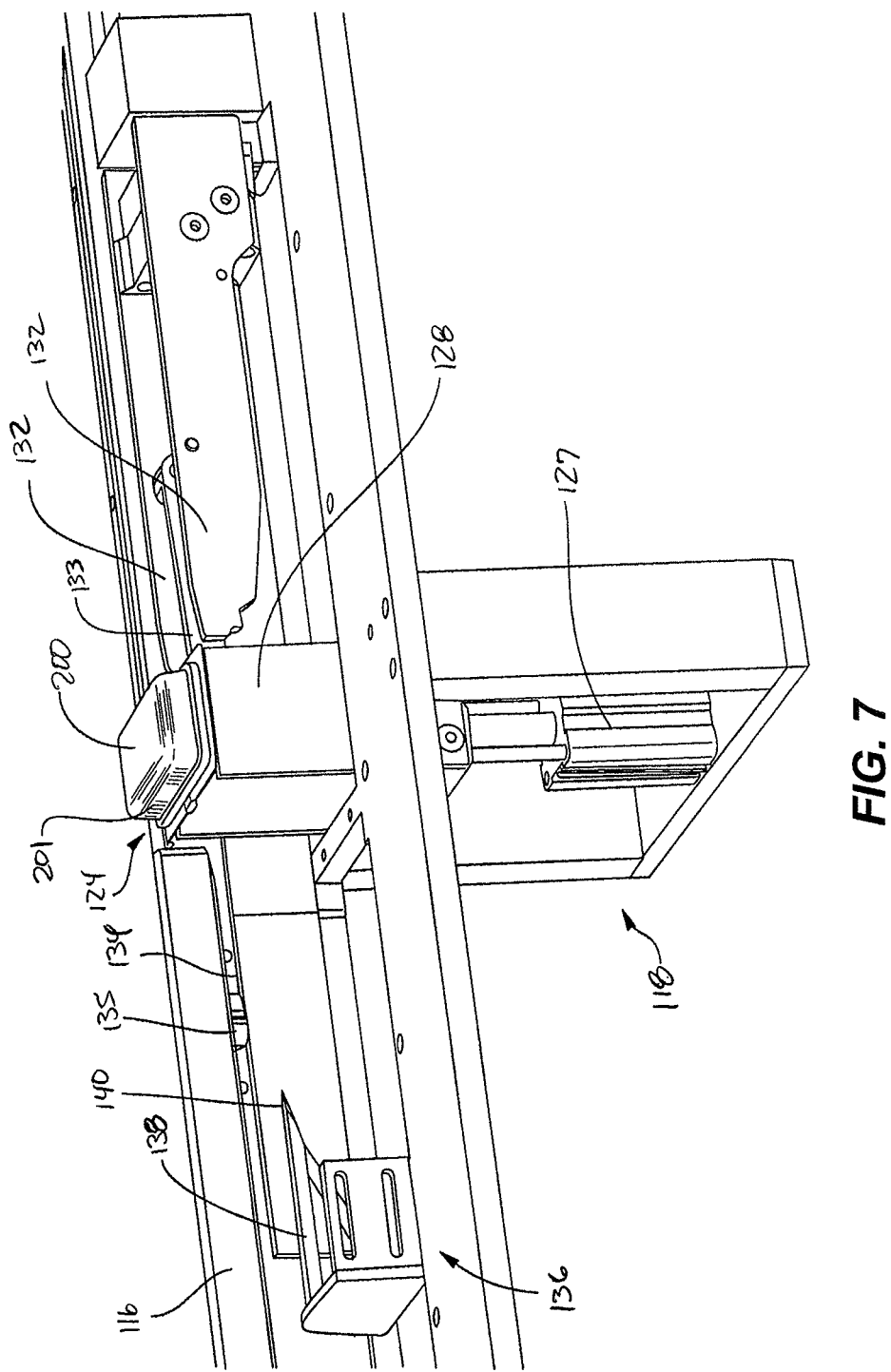
Figure 8:
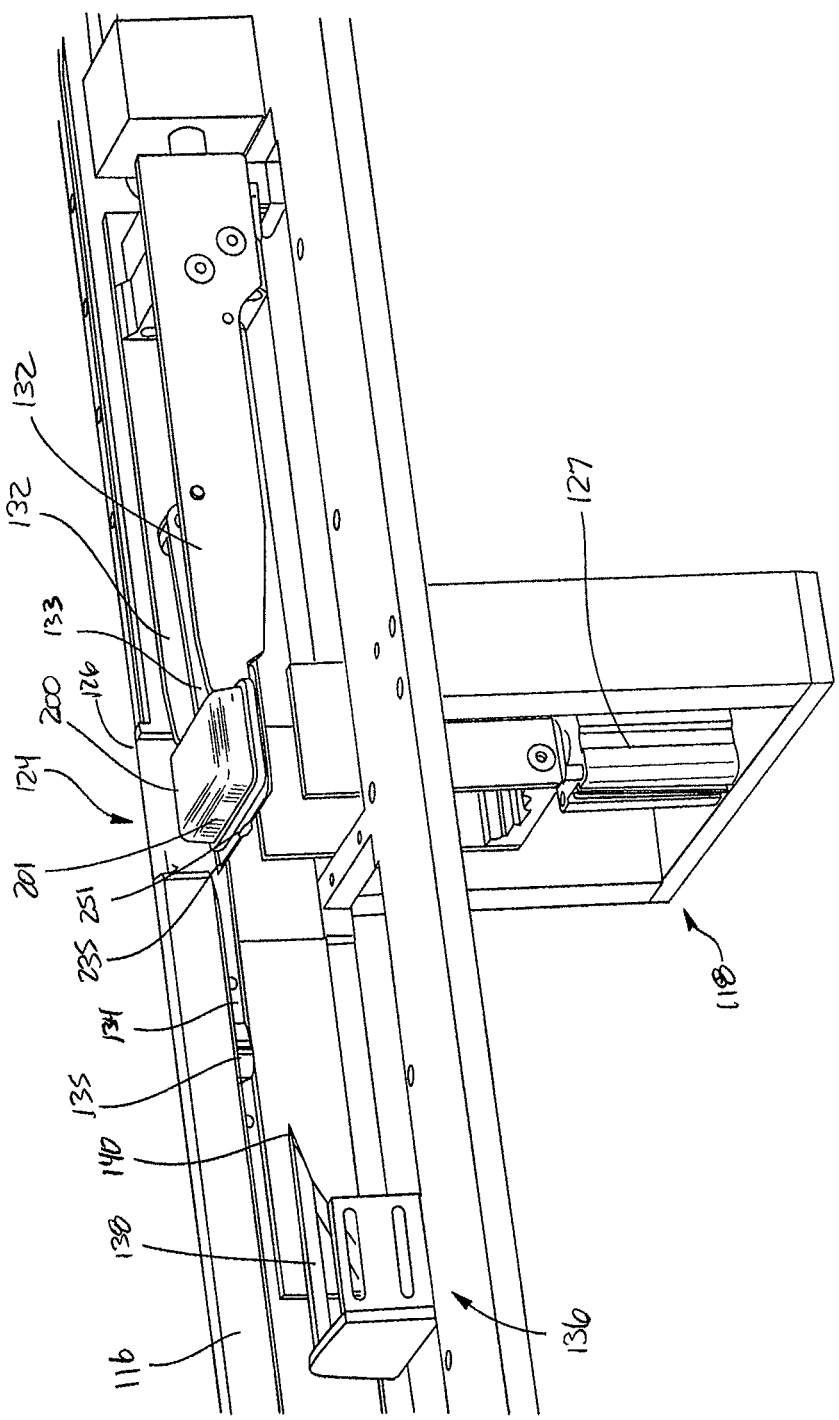
Figure 9:
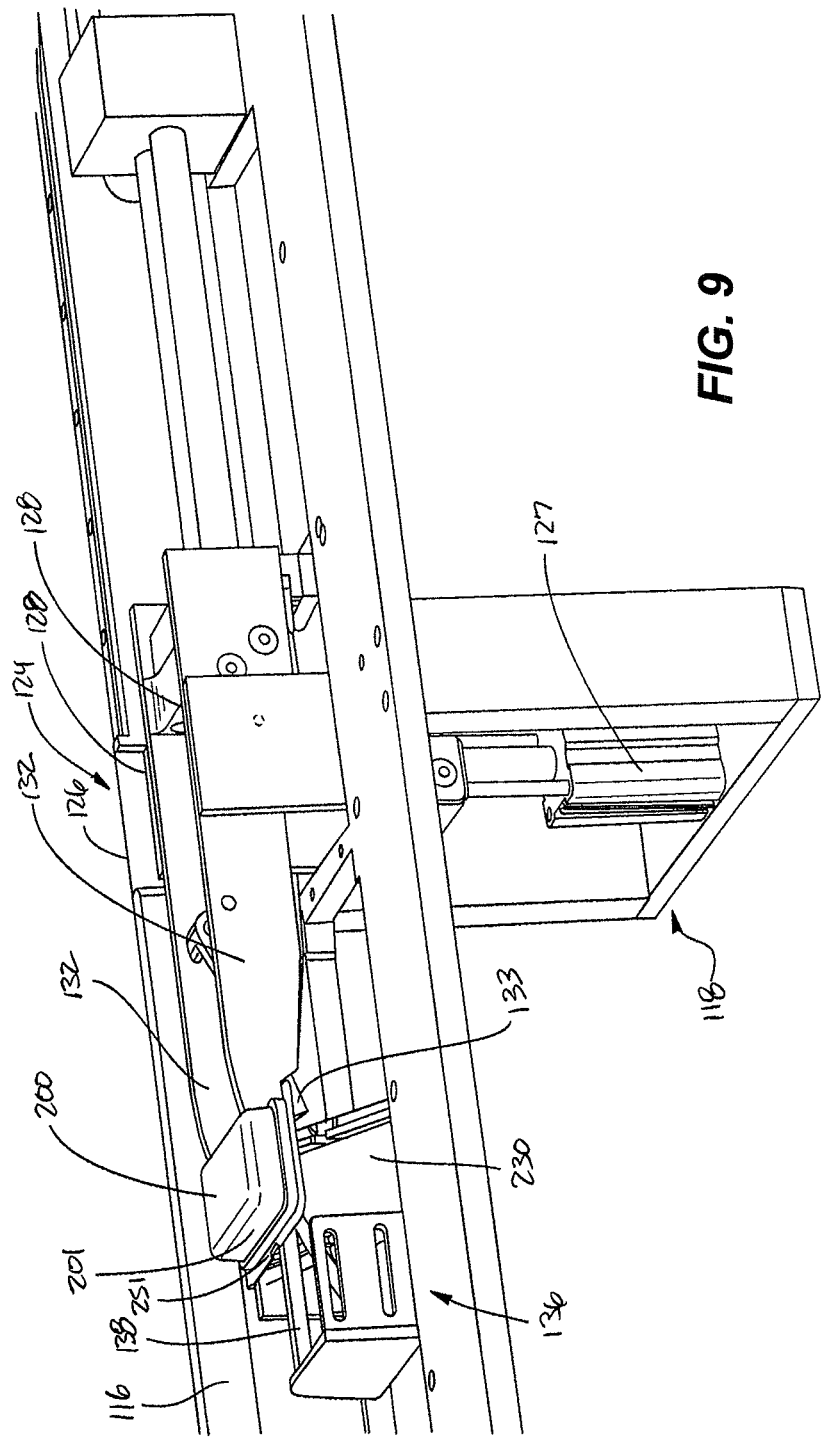
Figure 10:
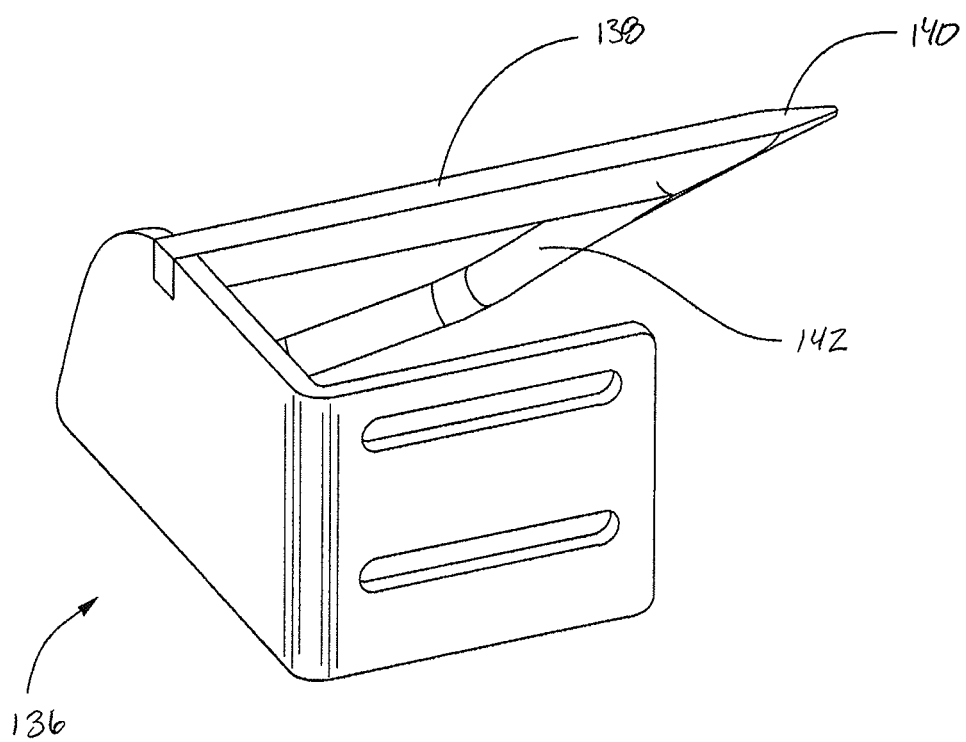
Figure 11:
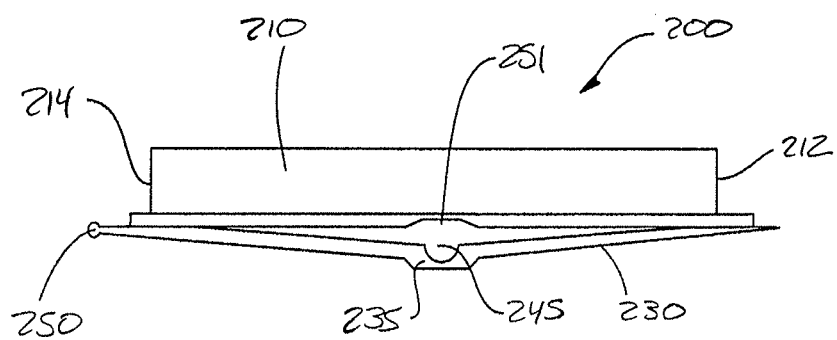
Figure 12:
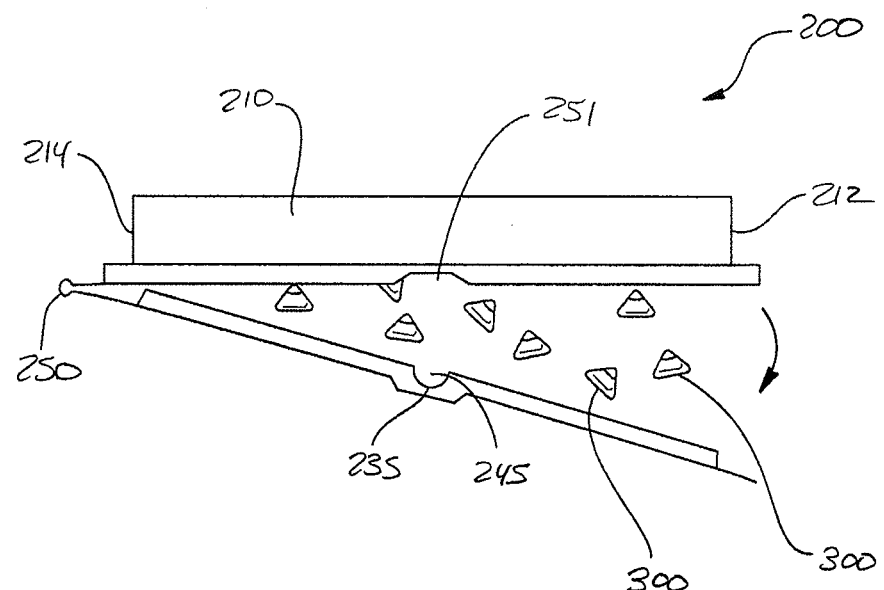
Figure 13:
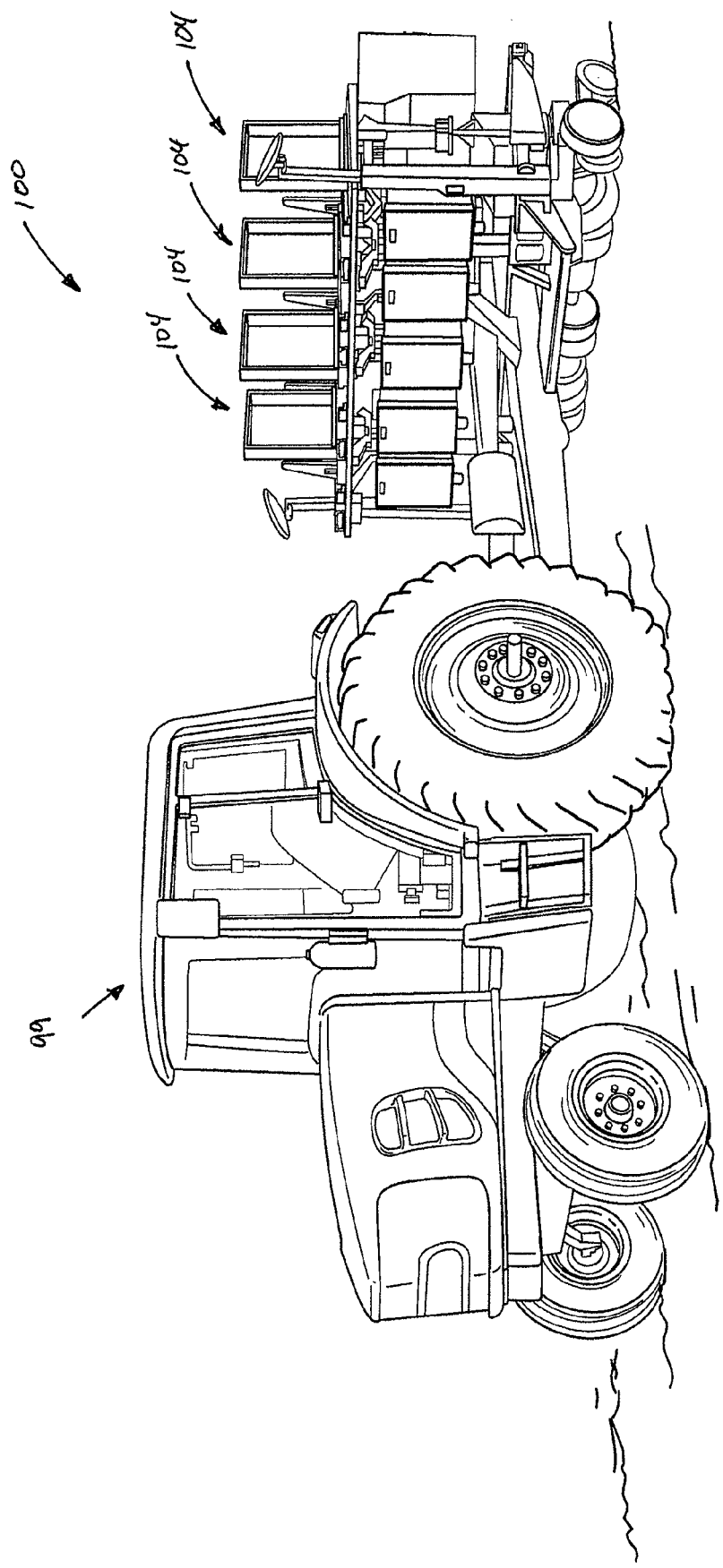
Figure 14:
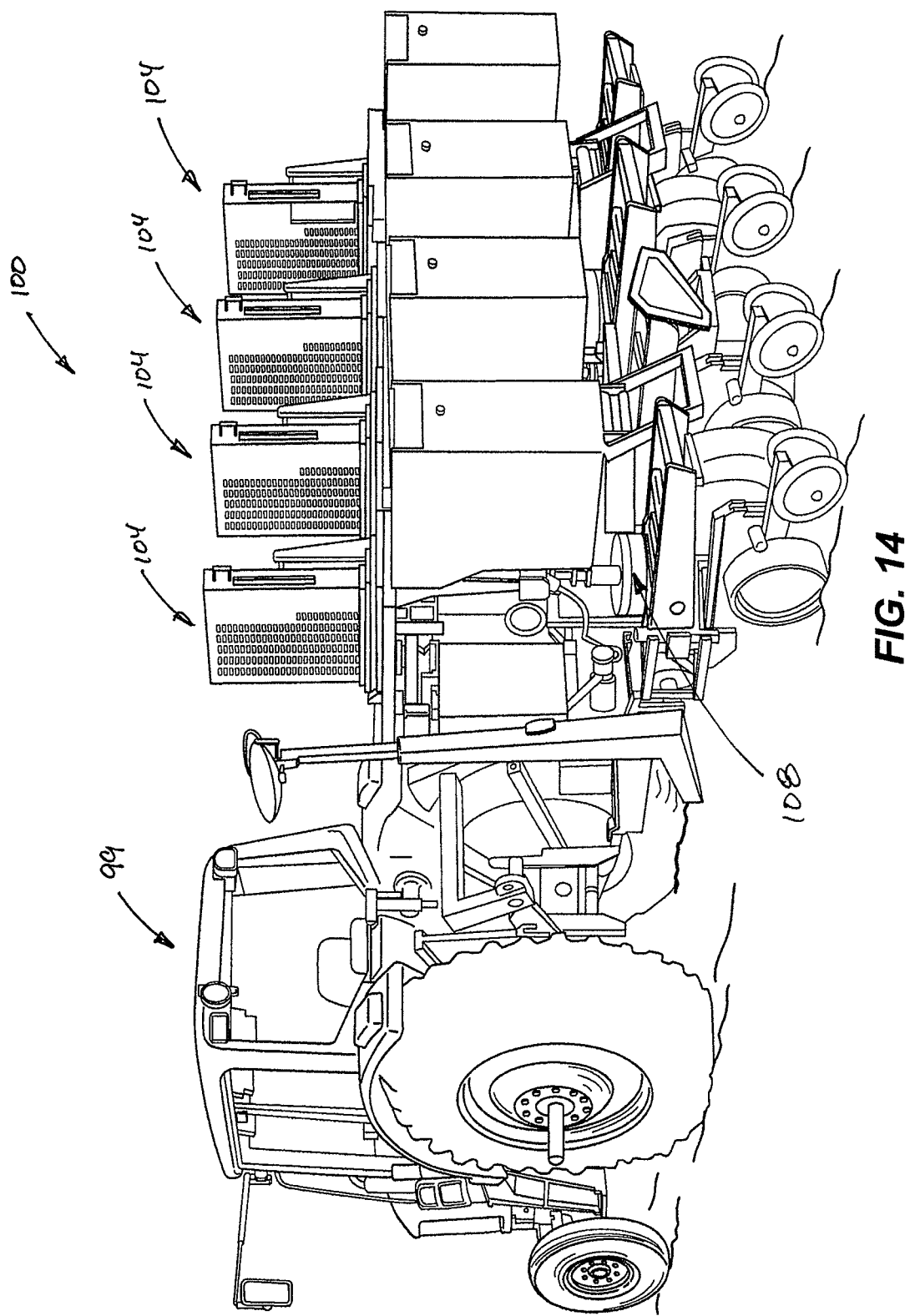
Figure 15:
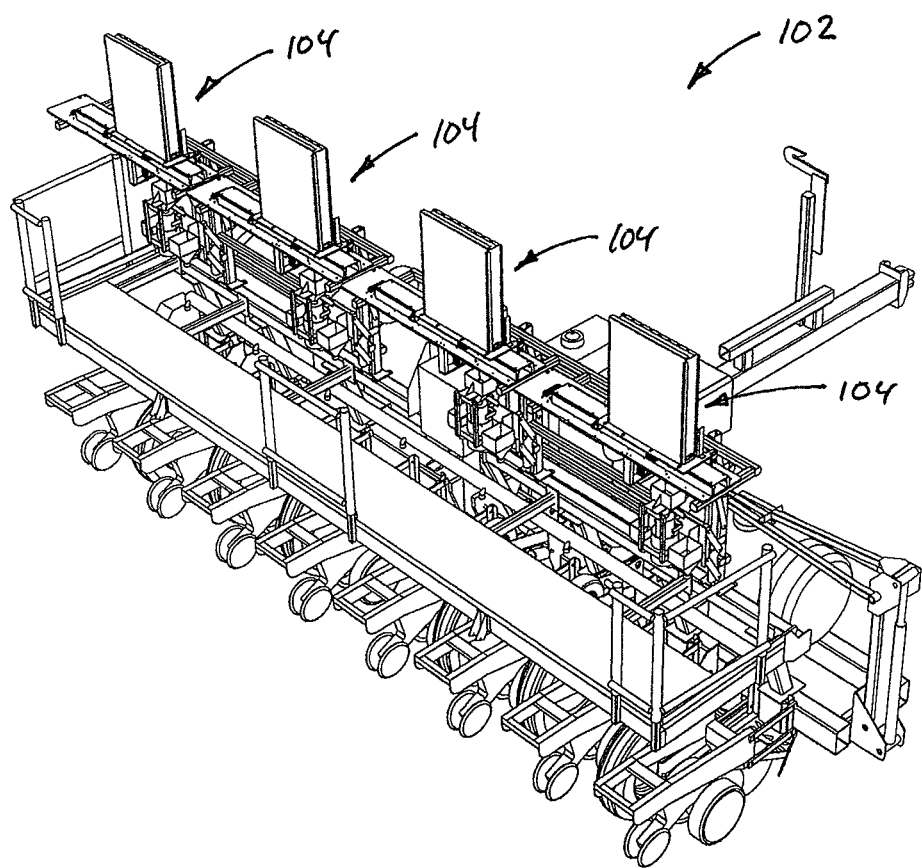
Figure 16:
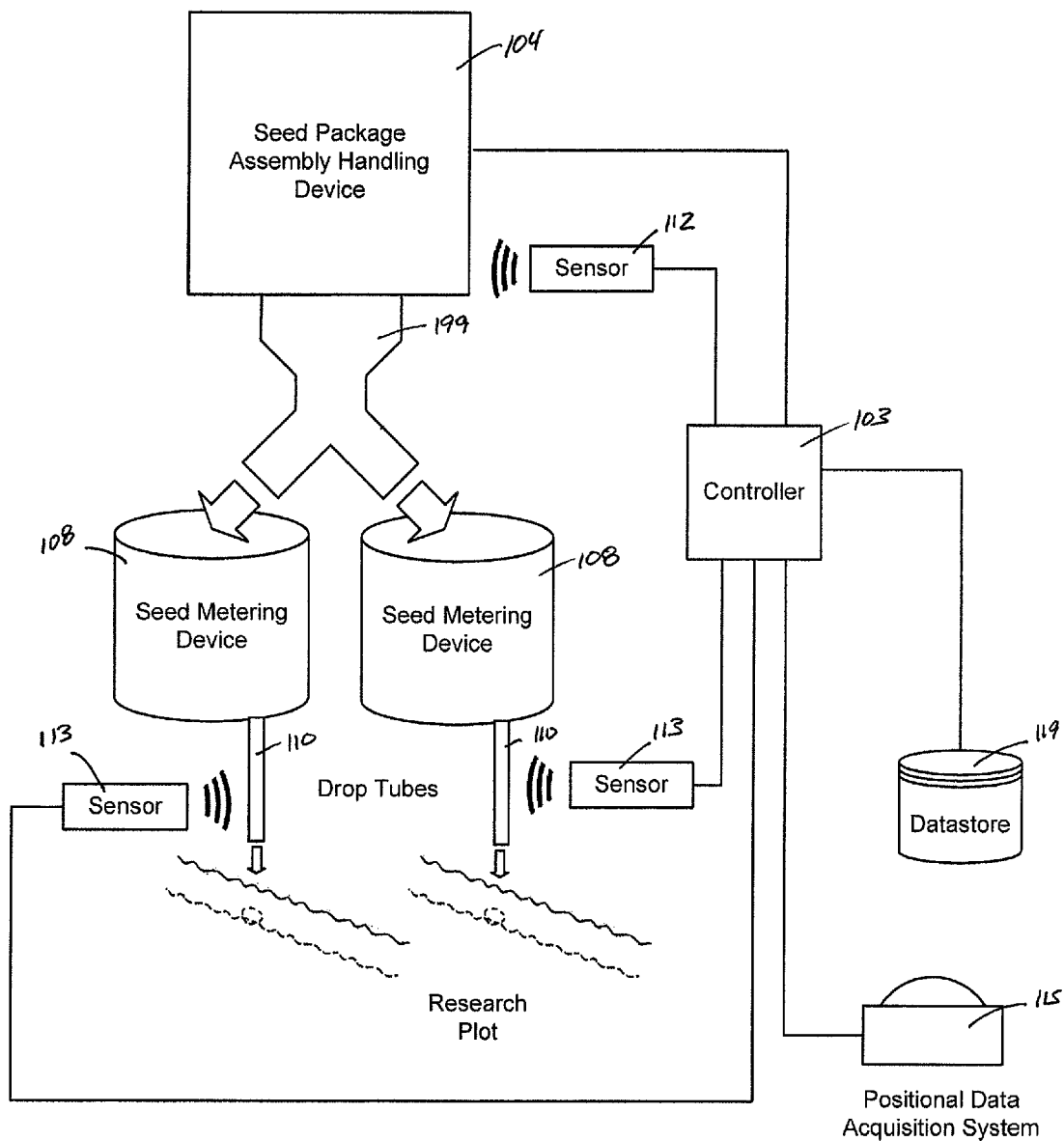

Having thus described the invention in general terms, reference will now be made to the accompanying drawings, which are not necessarily drawn to scale, and wherein:

FIG. 1 shows a typical prior art operator-controlled research seed planter, configured to plant two rows of seeds in a research plot;

FIG. 2 shows an automated research seed planter in accordance with an exemplary embodiment of the present invention configured to plant four rows of seeds in a research plot;

FIG. 3 shows a schematic drawing of portions a research seed planter in accordance with an exemplary embodiment of the present invention;

FIG. 4 shows a perspective view of a seed package assembly handling device of a research seed planter in accordance with an exemplary embodiment of the present invention;

FIG. 5 shows a perspective view from a reverse angle of the seed package assembly handling device of FIG. 4 in accordance with one exemplary embodiment of the present invention;

FIG. 6 shows a seed package assembly, in an open position, for use with the seed package assembly handling device of FIG. 4 in accordance with one exemplary embodiment of the present invention;

FIG. 6A shows a seed package assembly, in a closed position, for use with the package assembly handling device of FIG. 4 in accordance with one exemplary embodiment of the present invention;

FIG. 7 shows a perspective view from a reverse angle of the seed package assembly handling device of FIG. 4 wherein a seed package assembly is being lowered by an elevator assembly into a seed package assembly handling path in accordance with one exemplary embodiment of the present invention;

FIG. 8 shows a perspective view from a reverse angle of the seed package assembly handling device of FIG. 4 wherein a seed package assembly is being pushed by a pusher assembly along a seed package assembly handling path in accordance with one exemplary embodiment of the present invention;

FIG. 9 shows a perspective view from a reverse angle of the seed package assembly handling device of FIG. 4 wherein a seed package assembly is being pushed by a pusher assembly along a seed package assembly handling path into an opening tool and wherein a disengaging tool is being actuated, in accordance with one exemplary embodiment of the present invention;

FIG. 10 shows a perspective view from a reverse angle of an opening tool of a seed package assembly handling device in accordance with one exemplary embodiment of the present invention;

FIG. 11 shows a side view of a seed package assembly according to one embodiment of the present invention including an exemplary flexing action of a cover portion of the seed package assembly in response to an applied compressive force;

FIG. 12 shows a side view of a seed package assembly according to one embodiment of the present invention including disengagement of a cover portion from a container portion after the application of a compressive force;

FIG. 13 shows a front perspective view of an automated research seed planting system including a mobile planter transport device and a planter in accordance with an exemplary embodiment of the present invention;

FIG. 14 shows a rear prospective view of the automated research seed planting system of FIG. 13 in accordance with an exemplary embodiment of the present invention;

FIG. 15 shows a perspective view of a research seed planter in accordance with an exemplary embodiment of the present invention configured to plant eight rows of seeds in a research plot; and FIG. 16 shows a schematic drawing of portions a research seed planter which includes a seed handling splitter in accordance with an exemplary embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

As noted above, FIG. 1 shows a prior art operator-controlled research seed planter 10, configured to plant two rows of seed in a research plot including a planting operator seat 12, a seed storage area 14, and one or more seed metering systems 16. In a typical prior art planting process, a seed planting operator rides along with the research seed planter 10 as the planter is transported through a research plot, accesses coin envelopes, and opens the envelopes into one or more seed funnels 16 that deliver the seed to one or more seed metering systems 18 for depositing the seed into the research plot. Thus, the prior art represents a highly manual process fraught with the potential for error. The present invention presents an improvement over the prior art by providing an automated research planting system and method. In various embodiments, the automated research seed planting system and method reduce the manual processes involved in planting a research plot, and improve the accuracy of the planting system. In such a manner, characteristics of a research plot can be readily and accurately determined.

FIG. 2 shows a research seed planter 102 in accordance with an exemplary embodiment of the present invention. In the depicted embodiment, the research seed planter 102 is configured to be transported via a mobile planter transport device and is configured to plant four rows of seed in a research plot for each pass of the research seed planter 102. It should be noted that in other embodiments, a research seed planter in accordance with the present invention may be configured to plant any number of rows of seed as is commonly known in the art, examples may include, but need not be limited to, a research seed planter configured to plant sixteen rows or more of seed, or a research planter configured to plant one row of seed. Additionally, although in the depicted embodiment the research seed planter 102 is configured to be transported via a mobile planter transport device (such as, for example, a farm tractor, an all terrain vehicle, one or more horses, a multipurpose vehicle such as a Unimog or Humvee, etc.), in other embodiments the research seed planter may be self-propelled, such as, for example, by including an integrated transporting mechanism or device.

As noted above, the research seed planter 102 in the depicted embodiment is configured to plant as many as four rows of seed into a research plot for each pass of the research seed planter 102 and includes four seed package handling devices 104, each one being dedicated for each of the four rows to be planted. However, it should be noted that in other embodiments, a single seed package handling device may provide the seed for two or more rows of seed to be planted into the research plot. As will be discussed in more detail below, each seed package handling device 104 includes a seed tray assembly 105 configured to carry one or more seed package assemblies 200, with each seed package assembly 200 being configured to contain a research seed sample comprising one or more seeds. It should also be noted that each seed package assembly handling device 104 is configured to accommodate various sizes of seed tray assemblies, however, for illustration purposes in the depicted embodiment, the closest seed tray assembly 105 comprises a larger capacity seed tray assembly 105 than the other seed tray assemblies 105 shown in the figure.

In the depicted embodiment, each seed package handling device 104 automatically opens associated seed package assemblies 200 and releases research seed samples into a respective seed handling chute 106, which directs the seed into a respective seed metering device 108. Associated with each row to be planted of the research seed planter 102 is a conventional furrow opening apparatus 107 and a conventional furrow closing apparatus 109. Although various configurations of furrow opening and closing apparatuses are possible, in the depicted embodiment, the furrow opening apparatus 107 may include a pair of laterally spaced furrow opening discs and a pair of gauge wheels configured to set the depth of the furrow. The furrow closing apparatus 109 may comprise a pair of furrow closing discs. In general, as the research seed planter moves through the research plot, the furrow opening apparatus 107 opens a furrow, and individual seeds are released by the seed metering device through a drop tube 110 (not visible in FIG. 2) and into the research plot. The furrow closing apparatus 109 then closes the furrow. Seed package assemblies that have been opened are automatically deposited into respective waste containers 111, which are associated with each seed package handling device 104. It should be noted that in other embodiments, such as embodiments in which the seed package assemblies are constructed of biodegradable materials, there may be no need for waste containers as opened seed package assemblies may be discarded onto the ground. In still other embodiments, there may be one waste container that collects all of the opened seed package assemblies.

FIG. 3 shows a simplified schematic drawing of a portion of the research seed planter 102 in accordance with an exemplary embodiment of the present invention. In particular, FIG. 3 shows some of the components associated with each row to be planted including a seed package handling device 104, a seed handling chute 106, a seed metering device 108, a seed drop tube 110, a seed package assembly sensor 112, and a seed meter sensor 113. In general, under the control of a controller 103 each seed package handling device 104 of the depicted embodiment is configured to automatically release research seed samples into a respective seed handling chute 106, which directs the released seed to a respective seed metering device 108. It should be noted that for purposes of the current specification and appended drawings and claims, the term automatic, automatically, and other foams thereof refer to operations that require little, if any, manual intervention. The seed metering device 108 receives the seed released by the seed package handling device 104 and singulates the seed. Individual seeds are then released by the seed metering device through a respective drop tube 110 and into the research plot. In the depicted embodiment, the seed metering devices 108 are cone-type mechanical seed metering devices as are known in the art and available from various commercial sources, including, for example, ALMACO of Nevada, Iowa. It should be noted that in other embodiments, the seed metering devices may comprise any device configured to singulate seed. Other examples of seed metering devices configured for use with the present invention include, but are not limited to, vacuum-type seed metering devices as are known in the art and available from various commercial sources, including, for example, Seed Research Equipment Solutions, LLC of South Hutchinson, Kans. As will be discussed in more detail below, various sensors may also be included to sense various events of the planting process. For example, the seed package assembly sensor 112 may be included for sensing information pertaining to the seed package assemblies 200 released into the seed metering device 108, and the seed meter sensor 113 may be included for sensing seed drop events. In the depicted embodiment, the seed package assembly sensor 112 is an electronic reader configured to read identification information relating to the research seed sample contained in the package assembly 200. In various embodiments, the seed package assembly sensor 112 may be any device capable of sensing information from the seed package assembly 200, including, but not limited to, a barcode scanner capable of reading one or more barcodes associated with the seed package assembly 200, an optical character recognition (OCR) reader capable of reading human-readable information associated with the seed package assembly 200, a radio frequency identification (RFID) reader capable of identifying an RFID transponder associated with the seed package assembly 200, and/or any combination of the above. In the depicted embodiment, the seed meter sensor 113 comprises an optical seed drop sensor configured to sense the passage of a seed through the seed drop tube 110. However, in other embodiments, the seed meter sensor 113 may comprise different sensors configured to sense seed drop events, including, for example, a sensor that senses a position of one or more components of the seed metering device 108. For example, in some embodiments, the seed meter sensor device may sense one or more positions of the cone of a cone-type mechanical seed metering device such that the seed drop events may be determined.

In various embodiments, the research seed planter 102 (and/or an automated research seed planting system using a research seed planter) may include a positional data acquisition system 115 configured to acquire position data associated with one or more research seed planting events and/or to trigger one or more research seed planting events. In some embodiments, the positional data acquisition system 115 may communicate with the controller such that position data associated with one or more research seed planting events may be acquired and stored and/or transmitted. In various embodiments, a research seed planting event may include, for example, the release of research seed samples to the seed metering device and/or the release of individual seeds into the research plot. As such, in some embodiments, information about the location(s) of the research seed planting events may be analyzed and compared to existing research plans, which may indicate the targeted location(s) for the research seed planting events. In other embodiments, research plot maps may be generated using location(s) of the research seed planting events. In still other embodiments, research plots may be planted, such as according to one or more research plans, by triggering seed planting events at predetermined locations based on one or more research plans.

In various embodiments, a positional data acquisition system 115 may include, for example, one or more of the following: a timer system, a timer and encoder system, a cable system, a dead reckoning system, a satellite navigation system, etc. An example of a cable system may include, but need not be limited to, a cable that is wound about a spool and that includes position indicator buttons placed periodically along the length thereof. As a research seed planter is moved through the research plot, the cable is unwound and the position indicator buttons are sensed by a check-head or other sensing device. An example of a satellite navigation system may include, but need not be limited to, the global positioning system (GPS) or the International Global Navigation Satellite System (GNSS) Service (IGS). GPS systems enable very accurate location determination or position fixing by utilizing measurements of precise timing signals broadcast from a constellation of more than two dozen GPS satellites in orbit around the earth. Locations can be determined, for example, in terms of longitude, latitude, and altitude regardless of time, weather and location. Other satellite navigation systems include, but need not be limited to, International Global Navigation Satellite Systems (GNSS) Service (IGS), which have incorporated NAVSTAR satellites of the United States and GLONASS satellites from Russia along with additional satellite constellations to provide robust navigation capability. In general, IGS provides increased precision in location determination and enables the utilization of enhancements in the capabilities of satellite navigation system devices. A Differential Global Positioning System (DGPS) is an enhancement of GPS that incorporates additional ground-based reference stations that allow the calculation of differences between the measured GPS positions and the ground-based fixed locations so that corrections can be made for improved accuracy. Accordingly, it should be understood that, as used herein, the term satellite navigation system is meant to encompass any of a number of different systems including, for example, GPS, IGS, GNSS, NAVSTAR, GLONASS, DGPS, etc.

In the depicted embodiment, the controller 103 is configured to access and/or receive at least one instruction set, which may derived or extracted from one or more research plans. Although the controller 103 may receive an instruction set in any manner, in the depicted embodiment, the controller 103 communicates with a data store 119, which stores one or more instruction sets. Although not shown in the figure, in some embodiments, the system may also include a web server by which data from the data store 119 may be communicated over a network. It should be noted that although the controller 103 in the depicted embodiment is referred to as accessing and/or receiving at least one instruction set, which may be derived or extracted from one or more research plans, for the purposes of the current specification and appended drawings and claims, in some embodiments this may comprise accessing and/or receiving one or more research plans. According to various embodiments, information within an instruction set may include, but is not limited to, a map of the target seed locations in one or more research plots. Although the controller 103 of the depicted embodiment may communicate with the data store 119 over a network, in other embodiments the controller 103 may communicate directly with the data store 119. It should be noted that for the purposes of the current specification and appended drawings and claims, the term data store may include, but is not limited to, a database, text file, relational database, or any other manner of storing data, including, for example, electronic memory.

As will be discussed in more detail below, in various embodiments one or more instruction sets may be used by the controller 103 to control the seed package handling device(s) 104 to release seed samples. In such a manner seed samples may be released into the seed metering device 108 and into the research plot according to instruction sets or research plans. In some embodiments, the instruction sets or research plans may be updated, such as, for example, by communicating changes to the instruction sets over the network. Current manual processes do not monitor research plans and thus are not able to quickly and accurately change and adapt. For example, operators of manual prior art processes have no easy means of knowing when research plans are developed and/or altered and whether such development or alteration affects the disposition of seed samples in a particular research plot. By providing the controller 103 with access to one or more instruction sets associated with one or more research plans (such as, for example, by communication between the controller 103 and the data store 119), various embodiments of the present invention may quickly adapt to changes in the one or more research plans or instruction sets associated therewith. Additionally, by providing the controller 103 with access to one or more instructions sets, various embodiments of the present invention may facilitate work flow management by prioritizing and/or otherwise managing the planting of seed samples.

Although in various embodiments the seed handling device may have different structures, FIG. 4 shows a perspective view of a seed package assembly handling device 104 of a research seed planter 102 in accordance with one embodiment of the present invention. Such seed package assembly handling devices may include devices disclosed, for example, in U.S. Patent Publication No. 2009/0010750 assigned to the assignee of the present application and entitled "Method of Handling Clamshell Containers Containing a Particulate Aliquot," the disclosure of which is hereby incorporated by reference in its entirety. Generally, the seed package assembly handling device 104 of the depicted embodiment comprises the seed tray assembly 105, a base plate 114, first and second guide rails 116, 117, an elevator assembly 118, and a pusher assembly 120 (not visible in FIG. 4). The seed tray assembly 105 includes a row of columns 122 configured to hold a plurality of seed package assemblies 200. Such seed package assemblies may include assemblies disclosed, for example, in U.S. Patent Publication No. 2008/0006627 assigned to the assignee of the present application and entitled "Buckling Clamshell Container for Automated Aliquot and Dispersal Processes," the disclosure of which is hereby incorporated by reference in its entirety. It should be noted that in other embodiments of the present invention, the seed package assembly handling device 104 may be configured to accommodate only one seed package assembly 200, however providing capacity to accommodate a plurality of seed package assemblies 200 allows the research seed planter 102 to plant more seed in the research plot and/or to plant various seed varieties in the research plot.

The base plate 114 is located below the seed tray assembly 105, with the guide rails 116, 117 mounted in a spaced parallel arrangement on top of the base plate 114, such that the guide rails 116, 117 are disposed directly below the bottom of the seed tray assembly 105. In the depicted embodiment, the seed tray assembly 105, base plate 114, guide rails 116, elevator assembly 118, and pusher assembly 120 of the depicted embodiment are constructed primarily of metal materials, such as steel and/or aluminum, however in other embodiments these components may be constructed of any other material(s) suitable for handling package assemblies, as described below.

The seed tray assembly 105 is oriented with the guide rails 116, 117 such that the bottom of each of the columns 122 is substantially aligned between the guide rails 116, 117. Additionally, the seed tray assembly 105 is movable in a direction approximately aligned with arrow A1 so that the bottom of each column 122 may be substantially aligned with a loading area 124 (better viewed in FIG. 5) defined by opposing recesses 126 created in the first and second guide rails 116, 117. The loading area 124 is configured to receive a package assembly 200 for moving along a seed package assembly handling path defined by the guide rails 116, 117. The elevator assembly 118 is located below the loading area 124 and includes an elevating mechanism 127 which raises and lowers a pair of supports 128 in a direction approximately aligned with arrow A2. The supports 128 are located between the guide rails 116, 117 substantially aligned with the loading area 124. The elevator assembly 118 is configured to move the supports 128 in a direction approximately aligned with arrow A2. In the depicted embodiment, the tray assembly 105, the elevator assembly 118, and the pusher assembly 120 are movable through pneumatic power by control of the controller 103, however in other embodiments any one or any combination of the seed tray assembly 105, elevator assembly 118, or pusher assembly may be movable by other means, including, but not limited to, gear trains or screw drive systems driven by one or more electric motors controlled by the controller 103.

Although the seed tray assembly 105 of the depicted embodiment is shown empty, each column 122 is configured to hold a plurality of seed package assemblies 200, which may be stacked one on top of another in a closed position. So configured, the seed tray assembly 105 provides an array of closed package assemblies 200. In the depicted embodiment, the seed tray assembly 105 comprises a single row of eight columns, with each column configured to hold twenty-eight to fifty seed package assemblies 200. It should be noted that in other embodiments a column may be configured to hold any number of seed package assemblies 200. Additionally, in other embodiments a tray assembly may comprise a variety of configurations designed to suit differing storage, space, and/or performance constraints, including, for example, a three-dimensional array having multiple rows and columns. In such embodiments, the tray assembly may be movable in other directions so as to substantially align the bottoms of the columns with a loading area. Alternatively, multiple loading areas may be available to receive package assemblies from the tray assembly.

FIG. 5 shows a perspective view from a reverse angle of the seed package assembly handling device 104 in accordance with the exemplary embodiment of the invention depicted in FIG. 4. In this figure, the seed tray assembly 105 and the second guide rail 117 have been removed to facilitate discussion. Each of the first and second guide rails 116, 117 includes a support surface 134 which defines the seed package assembly handling path and along which a seed package assembly 200 travels after being loaded from the tray assembly 105 into the loading area 124. The pusher assembly 120 includes a pushing mechanism 130 that is configured to move a pair of pusher fingers 132 in a direction approximately aligned with arrow A3. The pusher fingers 132 are configured to move the seed package assembly 200 along the seed package assembly handling path. As will discussed in more detail below, the disengaging device 133 is configured to move in the general direction of A2 to aid in opening a seed package assembly 200. The pusher fingers 132 are located between the supports 128 and the pusher fingers 132 and the supports 128 move independent of, and do not interfere with, each other. A pinch area 135 is disposed in the first guide rail 116 along the support surface 134, downstream from the loading area 124. In some embodiments, the pinch area 135 is designed to apply a compressive force to the seed package assembly 200 as the seed package assembly 200 moves along the seed package assembly handling path. The pinch area 135 of the depicted embodiment is formed by a geometry of the first guide rail 116, such that a portion of the first guide rail 116 extends out some distance from the first guide rail 116 toward the second guide rail 117 so that the guide rails 116, 117 converge and a compressive force is applied to the package assembly 200 as it moves along the seed package assembly handling path past the pinch area 135 by squeezing the package assembly 200 between the first and second guide rails 116, 117. In various other embodiments, the pinch area 135 may be formed in a variety of ways including, but not limited to, a geometric configuration of the first and/or second guide rails that results in the first and second guide rails converging such that a compressive force is applied the seed package assembly; one or more pinch rollers defined by the first and/or second guide rails that extend inward so as to apply a compressive force to the seed package assembly; one or more actuated sections of the first and/or second guide rails wherein the one or more sections are configured to apply a compressive force to the package assembly when actuated inward; at least one adjustable insert or section located in one or both guide rails configured to deflect at least one of opposing sides of the seed package assembly, the insert or section being configured to adjust the amount of the compression force applied to the package assembly; and combinations thereof. In various embodiments, the mechanism(s) used to create the pinch area 135 may be configured to be deactivated by the controller, such as, for example, by retracting the mechanism(s) out of the path of the seed package assembly 200. It should also be noted that in some embodiments, a compressive force need not be applied to the seed package assembly and thus there need not be a pinch area.

An opening tool 136 that includes a spear 138 defining a spear end 140 (shown in more detail in FIG. 10) is located between the guide rails 116, 117 downstream from the loading area 124 and is configured such that a package assembly 200 moving along the seed package assembly handling path contacts the spear end 140. In the depicted embodiment, the opening tool 136 is constructed of a steel material, however in other embodiments it may be constructed of any material structured to facilitate opening of a seed package assembly 200.

The seed package assembly sensor 112 may be located proximate the seed package assembly handling path and may be configured to read a label 201 containing indicia (or some other identifying medium) associated with each package assembly 200 before the seed package assembly 200 opens to release a research seed sample. In the depicted embodiment, the label 201 includes machine-readable and/or human-readable information relating to the research seed sample contained in the package assembly 200. The seed package assembly sensor 112 may be any device capable of sensing information from the seed package assembly 200, including, but not limited to, a barcode reader, an OCR reader, a radio frequency identification (RFID) reader capable of identifying an RFID transponder associated with the seed package assembly 200, and/or a combination thereof. Additionally, although the seed package assembly sensor 112 of the depicted embodiment of the present invention is located proximate the seed package assembly handling path downstream from the loading area 124, in other embodiments a seed package assembly sensor could be located in a variety of locations. For example, one or more seed package assembly sensors could be located on either side of the seed package assembly 200 or proximate the tray assembly 105, the pusher assembly 120, the elevator assembly 118, and/or the opening tool 136. In other embodiments, seed package assemblies could be sensed with a separate seed package assembly sensor prior to being loaded in the tray assembly 105, such as, for example, a hand-held barcode scanner and/or RFID reader. However, it should be noted that not all embodiments of the present invention include a seed package assembly sensor.

Although in various embodiments of the present invention the seed package assemblies may have different structures (other structures may include, but are not limited to, pouches, bags, small boxes, etc.), FIGS. 6 and 6A show an exemplary seed package assembly 200 of a type that may be used in conjunction with the seed package assembly handling device 104 shown in FIGS. 4 and 5 in accordance with one exemplary embodiment of the present invention. Specifically, FIGS. 6 and 6A show a perspective view of a seed package assembly 200, in open and closed positions, respectively, which is usable in conjunction with the an exemplary embodiment of the present invention. As shown, the seed package assembly 200 may generally comprise a container portion 210 defining an opening 220 and including at least two opposing sides 212, 214. The seed package assembly 200 may further comprise a cover portion 230 configured to cooperate with the container portion 210 to selectively close the opening 220 defined by the container portion 210. It should be noted, however, that the method of handling package assemblies of various embodiments of the present invention described herein may operate on a variety of package assembly designs and thus the present invention should not be limited to use with the particular package assemblies those shown in the figures.

In order to effectively close the opening 220 defined by the container portion 210 of the depicted embodiment, the cover portion 230 may comprise a reinforcing ridge portion 240 operably engaged about a perimeter of the cover portion 230 and configured to be capable of engaging an inner periphery of the opening 220, in an interference fit, so as to selectively close the opening 220, such that the cover portion 230 is not easily disengaged from the container portion 210 without the application of a force, as described herein. It should be noted that in various embodiments, only a portion of the cover portion 230 and the container portion 210 may cooperate to hold the portions in a closed position. Moreover, an interference fit need not be required to hold the cover portion 230 in a closed position over the opening 220 of the container portion 210. The method of various embodiments of the present invention is operable in conjunction with seed package assemblies of a variety of designs, some of which are configured so that first and second portions at least partially separate in response to a force applied to the seed package assembly. In such a manner, the first and second portions may separate, at least partially, in response to the force, thus releasing at least a portion of a particulate aliquot contained within the package assembly. Thus, for example, package assemblies of other embodiments may comprise independent first and second portions wherein when the portions separate, one of the portions falls away from the other. Additionally, an adhesive or heat sealing material may be used to hold the first and second portions (or a portion of the first and second portions) in a closed position, wherein the adhesive or sealing material is designed to fail when the package assembly is subjected to a force.

The reinforcing ridge portion 240 of the depicted embodiment may also define a pair of flexure channels 245, 246 on opposing sides 231, 233 of the cover portion 230. Furthermore, the flexure channels 245, 246 may cooperate to define a flexure axis 242 extending substantially perpendicularly to the opposing sides 231, 233 of the cover portion 230 defining the flexure channels 245, 246 such that the flexure axis 242 is substantially parallel to the opposing sides 212, 214 of the container portion 210.

According to various embodiments of the present invention, the container portion 210, the cover portion 230, and the opening 220 defined by the container portion may be formed into a variety of different shapes. For example, in some embodiments, the various components of the package assembly 200 may be formed in a substantially rectangular shape. In other embodiments the various components (such as the container portion 210, cover portion 230, and reinforcing ridge portion 240) may be formed to have a variety of other shapes, including but not limited to: polygonal shapes (including, but not limited to rectangles, triangles, hexagons); circular; oval; semi-circular; and combinations of such shapes.

As shown in FIG. 6, the flexure channels 245, 246 defined in the reinforcing ridge portion 240 of the cover portion 230 may have different configurations on one side as compared to the other side. In other embodiments, the flexure channels 245, 246 may have the same configuration. In the depicted embodiment, flexure channel 245 has a partially rectangular cross-sectional shape and flexure channel 246 has a cross-sectional V-shape. According to other embodiments, the flexure channels 245, 246 may also define various other cross-sectional shapes that may be tailored to define a flexure axis 242 extending substantially perpendicularly to the opposing sides 231, 233 of the cover portion 230. For example, one or both of the flexure channels 245, 246 may, in some alternative embodiments, define cross-sectional shapes that may include, but are not limited to: partial rectangular; oval; circular; triangular; and combinations of such cross-sectional shapes. For example, in FIGS. 11 and 12, both flexure channels define half circular cross-sections. The shape of the cross-section of the flexure channels 245, 246 may thus be tailored to suit the material used to form the cover portion 230 and/or the reinforcing ridge portion 240 so as to define a distinct flexure axis 242 across a width of the cover portion 230 such that the cover portion flexes outwardly from the container portion 210 about the flexure axis 242 defined by the opposing flexure channels 245, 246 (see, for example, FIG. 12, showing the flexing action of the cover portion 230 about the flexure axis 242 in response to a compressive force applied to the seed package assembly 200).

Thus, in the depicted embodiment the cover portion 230 may be configured to flex outwardly from the container portion 210 about the flexure axis 242, when a compressive force is applied to at least one of two opposing sides 212, 214 of the container portion 210. The compressive force may thus initiate the disengagement of the reinforcing ridge portion 240 from the inner periphery of the opening 220 so that the cover portion 230 disengages from the container portion 210. The seed package assembly 200 of the depicted embodiment is inverted such that the cover portion 230 may drop away (see FIG. 12) from the container portion 210 after the reinforcing ridge portion 240 has been disengaged from the inner periphery of the opening 120 due to a compressive force applied to the opposing sides 212, 214 of the container portion 210.

The seed package assembly 200 may thus be used to release one or more seeds 300 (such as a comprising a research seed sample) that have been segregated and contained within the container portion 210 of the seed package assembly 200 of the present invention. As described generally above, the seed package assembly 200 of various embodiments of the present invention may be advantageously opened by the simple application of a compressive force to at least one of the opposing sides 212, 214 of the container portion 210 of the package assembly 200 while suspending the package assembly 200 in an inverted position.

As shown generally in FIG. 6A, the seed package assembly 200 may further comprise a hinge portion 250 operably engaged between an edge of the cover portion 230 and one of the at least two opposing sides 212, 214 of the container portion 210 such that the cover portion 230 and the container portion 210 may form a substantially seed unitary package assembly 200 even when the cover portion 230 (and the reinforcing ridge portion 240 extending therefrom) is disengaged from the inner periphery of the opening 220 defined in the container portion 210 (as shown generally in FIG. 11). In some embodiments of the present invention, the hinge portion 250 may be integrally formed with one or both of the container portion 210 and the cover portion 230 to form a unitary seed package assembly 200. According to some alternative embodiments, the hinge portion 250 may also be operably engaged with one or both of the container portion 210 and the cover portion 230 using an adhesive material in order to form the seed package assembly 200. As described generally above, the hinge portion 250 may be formed with a bias towards the "open" position (as shown generally in FIG. 11) such that the hinge portion 250 may urge the cover portion 230 generally away from the container portion 210 once the compressive force has caused the initial disengagement of the reinforcing ridge portion 240 from an inner periphery of the opening 220 defined in the container portion 210.

Furthermore, as shown generally in FIGS. 6 and 6A, the seed package assembly 200 may also comprise a pair of complementary flange portions 219, 232 extending outward from an outer periphery of the opening 220 and the reinforcing ridge portion 240 of the cover portion 230, respectively. For example, the seed package assembly 200 may further comprise a first flange portion 219 extending substantially perpendicular from at outer periphery of the opening 220, and a second flange portion 232 extending substantially outward from the reinforcing ridge 240 such that when the cover portion 230 closes the opening 220 defined by the container portion 210, the first flange portion 219 is substantially adjacent and parallel to the second flange portion 232. Furthermore, the second flange portion 232 may define a pair of opposing concave portions 235 substantially coaxial with the flexure axis 242. According to such embodiments, the concave portions 235 may form a corresponding pair of apertures between the first and second flange portions 219, 232 when the cover portion 230 closes the opening 220 defined by the container portion 210. For example, in some of such embodiments, the pair of apertures defined by the opposing concave portions 235 formed in the second flange portion 232 may be adapted to be capable of receiving an opening tool 136 (described in more detail with respect to FIGS. 7-10) for encouraging the cover portion 230 to flex outwardly from the container portion 210 about the flexure axis 242 so that the cover portion 230 disengages from the container portion 210. In various embodiments, an opening tool may be any implement configured to aid in encouraging package assembly portions to separate, such as a screwdriver, knife, or other narrow-bladed implement, etc. Thus, such opposing concave portions 235 defined in by the second flange portion 232 may serve to define a corresponding pair of apertures between the flange portions 219, 232 so that the opening tool 136 may be inserted into the aperture located at or near the flexure axis 242 so as to further urge the cover portion 230 out of its interference fit with the container portion 210. The package assembly 200 of the depicted embodiment also includes at least one corresponding concave portion 251 defined by the first flange portion 219. The corresponding concave portion 251 is configured such that when the cover portion 230 is engaged with the container portion 210, the container ridge 251 substantially aligns with one of the opposing concave portions 235 defined by the second flange portion 232. In such a manner, the aligned concave portion 235 and corresponding concave portion 251 form a larger aperture between the first and second flange portions 219, 232 when the cover portion 230 closes the opening 220 defined by the container portion 210. As a result, the aperture formed by the concave portion 235 and the corresponding concave portion 235 creates a larger target for receiving an opening tool for encouraging the cover portion 230 to flex outwardly from the container portion 210 about the flexure axis 242 so that the cover portion 230 disengages from the container portion 210. It should be noted that in other embodiments, concave portions need not be included on the seed package assembly. For such embodiments, an opening tool may still be used to at least partially separate portions of a package assembly by inserting the opening tool between the portions.

A notch portion 253 is defined by the first flange portion 219 of the depicted embodiment. The notch portion 253 is configured to allow a disengaging device 133 (described in more detail with respect to FIGS. 5-7) to exert a force approximately normal to the second flange 232 through the notch portion 253. In such a manner, the disengaging device 133 may further facilitate disengaging the cover portion 230 from the container portion 210. In various embodiments, a disengaging device may be any device, tool, and/or mechanism configured to exert a force through the notch portion 253 against the second flange 232. As such, in various embodiments a disengaging device may be used alone, or in combination with the opening tool 136 received in one or both of the pair of apertures defined by the opposing ridges 235. As a result, in various embodiments, this may increase opening success for packaging assemblies with dimensional variability. It should be noted that although the notch portion 253 shown in the depicted embodiment is generally rectangular in shape, one skilled in the art will recognize that a notch portion in accordance with the present invention may take many other shapes, including, but not limited to, a half circular shape, a half oval shape, a triangular shape, a circular shape, an oval shape, and combinations thereof. It should also be noted that in various embodiments, the disengaging device 133 may be deactivated by the controller 103 such as, for example, by not actuating the disengaging device 133 so that it does not act upon the seed package assembly 200.

FIGS. 7-9 depict a method of opening seed package assemblies 200 in accordance with various exemplary embodiments of the present invention. In these figures, the tray assembly 105 and the second guide rail 117 have been removed to facilitate discussion. The method of handling package assemblies of various embodiments of the present invention may handle one or a plurality of package assemblies. Referring to depicted embodiment of FIG. 7, although a single seed package assembly 200 is shown, the description assumes that a stack of seed package assemblies exists above the depicted seed package assembly 200. The process begins with the tray assembly 105 moving such that a column 122 containing a stack of package assemblies is aligned with the loading area 124, which is defined by opposing recessed areas 126 located in the first and second guide rails 116, 117. The distance between the first and second guide rails 116, 117 in the loading area 124 is configured to be slightly greater than the length of the seed package assembly 200. In this manner, the supports 128 may move into contact with the bottommost seed package assembly 200 and the stack of seed package assemblies may be moved up and down by the elevating mechanism 127 proximate the loading area 124. Once a stack of seed package assemblies has been moved by the tray assembly 105 into a position approximately aligned with the loading area 124, the elevating mechanism 127 moves the supports 128 into contact with the bottommost seed package assembly 200. The entire stack of package assemblies is then moved downward so that the flanges 219, 232 of the bottommost seed package assembly 200 approximately align with the support surfaces 134 of the first and second guide rails 116, 117. As the elevating mechanism 127 lowers the stack of package assemblies, the label 201 of the seed bottommost package assembly 200 may be sensed by the seed package assembly sensor 112 (not shown). In this manner, information pertaining to the bottommost seed package assembly 200, which is the seed package assembly entering the seed package assembly handling path, may be recorded. As the elevating mechanism 127 continues to lower the stack of package assemblies, the flanges 219, 232 of the bottommost seed package assembly 200 contact the support surfaces 134 of the first and second guide rails 116, 117. As shown in FIG. 6A, in some embodiments the length of second flange portion 232 may be shorter than the length of first flange portion 219 so that when the seed package assembly 200 is lowered onto the support surfaces 134, the first flange portion 219 contacts the support surface 134 of the second guide rail 117 so that the cover portion 230 may be free to separate from the container portion 210 upon application of a force.

In FIG. 8, the pushing mechanism 130 (not shown) moves the pusher fingers 132 into contact with the bottommost seed package assembly 200 such that the seed package assembly 200 may be pushed out from the bottom of the stack of package assemblies, along the seed package assembly handling path. The top surfaces of the pusher fingers 132 are configured so that as the pusher fingers 132 move the bottommost seed package assembly 200 out from under the stack of seed package assemblies and along the seed package assembly handling path, the remaining stack of seed package assemblies rides on top of the pusher fingers 132. Once the pusher fingers 132 move past the stack of seed package assemblies, the elevating mechanism 127 moves the supports 128 upward, lifting the stack of seed package assemblies off of the pusher fingers 132. The pushing mechanism 130 then continues to drive the pusher fingers 132, thus moving the seed package assembly 200 along the seed package assembly handling path defined by the support surfaces 134, past the pinch area 135. As noted above, the pinch area 135 extends out some distance from the first guide rail 116 toward the second guide rail 117 such that as the seed package assembly 200 passes the pinch area 135, pressure is exerted on surface 244 of the seed package assembly 200, and the seed package assembly 200 is forced against the second guide rail 117 and is thus subjected to a compressive force. In the depicted embodiment, the compressive force is applied against the hinge portion 250 and surface 244 on the opposite end of the seed package assembly 200. As such the compressive force is applied approximately perpendicular to the flexure axis 242. The compressive force causes the cover portion 230 of the seed package assembly 200 to flex outwardly from the container portion 210 about the flexure axis 242, which causes the cover portion 230 of the package assembly 200 to bow downward (as shown, for example, in FIG. 11). In some embodiments, this compressive force initiates the disengagement of the reinforcing ridge portion 240 from the inner periphery of the opening 220 so that the cover portion 230 disengages from the container portion 210. As shown in FIG. 12, in such embodiments the cover portion 230 drops away from the container portion 210 after the reinforcing ridge portion 240 has been disengaged from the inner periphery of the opening 220. It should be noted that in other embodiments, no compressive force is applied to the seed package assembly 200 and separation of the cover portion 230 and container portion 210 occurs via application of one or more different forces.

In some embodiments, such as the depicted embodiment, additional devices and/or mechanisms may be used to apply a force to the seed package assembly 200 to further encourage the cover portion 230 to disengage from the container portion 210. Referring to FIG. 9, once the cover portion 230 is bowed about the flexure axis 242, the pushing mechanism 130 drives the pusher fingers 132 to move the seed package assembly 200 such it engages an opening tool 136 (shown by itself in FIG. 10). In particular, the seed package assembly 200 is moved along the seed package assembly handling path such that an existing aperture defined by one of the opposing concave portions 235 and corresponding concave portion 251 of the seed package assembly 200 contacts the spear end 140 of the opening tool 136. In the depicted embodiment, the opening tool 136 is rigidly attached to the second guide rail 117 such that as the seed package assembly 200 continues to move along the seed package assembly handling path, the spear 138 inserts between the cover portion 230 and the container portion 210 of the seed package assembly 200. However in other embodiments, the opening tool 136 may be secured to various other structures of the seed package assembly handling device 104 in various different manners, and in some embodiments, the opening tool 136 may be configured to be deactivated by the controller, such as, for example, by retracting the opening tool 136 out of the path of the seed package assembly 200.

Concurrently, in the depicted embodiment a disengaging tool 133, which is located between the pusher fingers 132, is actuated via pneumatic power, however in other embodiments the disengaging tool 133 may be actuated in various other ways, and in some embodiments there need not be a disengaging tool 133. Once actuated, the disengaging tool 133 of the depicted embodiment is configured to push downward through the notch portion 253 defined by the first flange portion 219 of the package assembly 200. In such a manner, the disengaging device 133 exerts a force approximately normal to the second flange 232 through the notch portion 253 further encouraging the cover portion 230 to disengage from the container portion 210. Thus, in the depicted embodiment, the opening tool 136 and the disengaging tool 133 ensure that the cover portion 230 completely disengages from the container portion 210.

If, as shown in the figures, the seed package assembly 200 is inverted, the cover portion 230 may drop away from the container portion 210 after the reinforcing ridge portion 240 has been disengaged from the inner periphery of the opening 220. Once the cover portion 230 has disengaged from the container portion 210, a deflecting arm 142 of the opening tool 138 deflects the cover portion 230 such that it is held away from the container portion. As shown generally in FIG. 12, the package assembly 200 may thus be used to release the research seed sample 300 contained within the container portion 210 of the seed package assembly 200.

It should be noted that although the depicted embodiments show a method in which portions of a seed package assembly are at least partially separated by applying several forces to the package assembly (i.e., applying a compressive force to opposing sides of the package assembly, inserting an opening tool between portions of the package assembly, and applying an approximately normal force to a flange defined in one portion of the package assembly), in other embodiments a seed package assembly may be at least partially separated by applying any one force to the seed package assembly or any combination of forces to the seed package assembly. Additionally, although the depicted embodiments show a method in which portions of a package assembly are at least partially separated by applying several forces to the seed package assembly as the package assembly moves along a package assembly handling path, in other embodiments any one force may be applied to the package assembly or any combination of forces may be applied to the package assembly without requiring the package assembly to move along a package assembly handling path. That is, in other embodiments any one force or any combination of forces adapted to at least partially separate portions of a package assembly may act on an unmoving package assembly.

For various reasons, the seed package assembly handling device 104 may also be capable of bypassing the dispensing operation with respect to one or more of the seed package assemblies 200. For example, the controller 103 may control the seed package assembly handling device 104 to deactivate the mechanism(s) causing the opening force(s). In various embodiments, the controller 103 may control the seed package assembly handling device 104 not to open a seed package assembly 200 if, for example, the controller 103 receives information read from the seed package assembly 200 by the seed package assembly sensor 112 that is not consistent with information expected of the seed package assembly 200. In particular, when bypassing is desired, the controller 103 may control the seed package assembly handling device 104 to deactivate the mechanism(s) that create opening force(s), which may include, for example, retracting the mechanism(s) that create the pinch area 135, deactivating the disengaging device 133, and/or retracting the opening tool 136. In such a manner, the seed package assembly 200 may travel from the seed tray assembly 105 to the waste container 111 without being opened.

FIGS. 13 and 14 show a front perspective view and a rear prospective view, respectively, of an automated research seed planting system 100 that includes a mobile planter transport device 99 and a research seed planter 102 in accordance with an exemplary embodiment of the present invention. In the depicted embodiment, the research seed planter 102 is configured to be transported via the mobile planter transport device 99 and is configured to plant four rows of seed in a research plot for each pass of the research seed planter 102. The research seed planter 102 of the depicted embodiment includes four seed package handling devices 104, and four seed metering devices 108, with a seed package handing device 104 and a seed metering device 108 being associated with each of the four rows to be planted. In the depicted embodiment, the research seed planting system 100 also includes a positional data acquisition system 115 (not visible in FIGS. 13 and 14) configured to acquire position data associated with one or more research seed planting events. The research seed planter 102 of the depicted embodiment also includes a seed package assembly sensor 112 (not visible in FIGS. 13 and 14), associated with each of the seed package assembly handling devices 104, for sensing information pertaining to the seed package assemblies 200, and a seed drop sensor 113 (not visible in FIGS. 13 and 14) for sensing seed drop events. As a result, specific locations within the research plot where a particular seed package was released into a respective seed metering device and/or specific locations in the research plot where individual seeds from a particular seed package were released into the research plot can be determined. In some embodiments, these locations may be compared to one or more instruction sets or research plans and/or may be used to update one or more instruction sets and/or research plans. In other embodiments, these seed drop events may be triggered as a result of the position of the research seed planter 102 in the research seed plot.

FIG. 15 shows a research seed planter 102 in accordance with another exemplary embodiment of the present invention. In the depicted embodiment, the research seed planter 102 is configured to be transported via a mobile planter transport device (not visible in FIG. 15) and is configured to plant eight rows of seed in a research plot for each pass of the research seed planter 102. The eight rows of seed are supplied by four seed package handling devices 104, each one being dedicated for adjacent pairs of the eight rows to be planted. In the depicted embodiment, the orientations of the seed package handling devices 104 are rotated with respect to the research seed planter 102 but are otherwise configured similarly as explained with respect to FIG. 2, with each seed package handing device having a seed tray assembly 105 configured to carry one or more seed package assemblies 200 that are configured to contain a research seed sample comprising one or more seeds. FIG. 16 shows a schematic drawing of portions of a similar research seed planter in accordance with an exemplary embodiment of the present invention. In particular, FIG. 16 shows some of the components associated with each pair of rows to be planted including a seed dispensing device 104, a seed handling splitter 199, a pair of seed metering devices 108, a pair of seed drop tubes 110, a pair of seed package assembly sensors 112, and a pair of seed meter sensors 113. As shown in the drawing, each seed dispensing device 104 automatically opens associated seed package assemblies 200 and releases research seed samples into the seed handling splitter 199, which directs the seed into the pair of respective seed metering devices 108. In various embodiments a precision seed splitter may be used, such as, for example, as is available from many commercial sources, including ALMACO of Nevada, Iowa. As similarly described above, the seed metering devices 108 receive the seeds released by the seed package handling device 104 and singulate the seeds. Individual seeds are then released by the seed metering device through a drop tube 110 and into the research plot.

Although the embodiment depicted in FIG. 16 employs two-way splitters, it should be noted that in other embodiments, other types of splitters may be used, including four-way and eight-way splitters, etc. Additionally, in other embodiments groups of seed package handling devices may be associated with the same splitter so as to provide increased capacity. For example, in one embodiment four pairs of seed handling devices are provided in an eight row planter with each pair of seed handling devices being associated with a two-way splitter. In such a manner, each row to be planted is supplied by one of two seed handling devices, allowing one of the two seed handling devices to empty all of its seed package assemblies before the other of the two seed handling devices starts to empty its seed package assemblies.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An automated research seed planting system, the system comprising:
a planter configured for planting a research plot and comprising a seed package assembly handling device configured to receive a seed package assembly containing a research seed sample; and
a controller configured to communicate with the seed package assembly handling device,
wherein the controller is configured to control the seed package assembly handling device to automatically release the research seed sample from the seed package assembly.

2. The automated research seed planting system according to claim 1, wherein the controller is further configured to automatically control the seed package handling device to apply a force to the seed package assembly to release the research seed sample from the seed package assembly.

3. The automated research seed planting system according to claim 2, wherein the seed package assembly handling device is configured to open a seed package assembly comprising first and second portions that cooperate to contain the research seed sample, and wherein the seed package assembly handling device is configured to apply a force to the seed package assembly so that the first and second portions of the seed package assembly at least partially separate thus releasing the research seed sample.

4. The automated research seed planting system according to claim 1, wherein the controller is configured to control the seed package assembly handling device to bypass releasing the research seed sample from the seed package assembly.

5. The automated research seed planting system according to claim 1, wherein the controller is configured to control the seed package assembly handling device according to one or more instruction sets.

6. The automated research seed planting system according to claim 5, wherein one or more instructions sets are derived from one or more research plans.

7. The automated research seed planting system according to claim 4, wherein at least one of the research plans or the instruction sets are stored in at least one data store.

8. The automated research seed planting system according to claim 3, wherein the force comprises at least a compressive force and wherein the compressive force causes at least one of the first or second portions of the seed package assembly to flex outwardly from the other portion about a flexure axis so that the first and second portions at least partially separate in response to the force, thus releasing the research seed sample.

9. The automated research seed planting system according to claim 8, wherein the seed package assembly handling device further comprises an opening tool and a disengaging tool, and wherein the controller is further configured to cause the opening tool to contact between the first and second portions of the seed package assembly and to automatically control the seed package assembly handling device to apply a second force to the package assembly via the disengaging tool, for encouraging at least one of the first or second portions to flex outwardly from the other portion about the flexure axis so that the first and second portions separate.

10. The automated research seed planting system according to claim 1, wherein the seed package assembly includes at least one of a machine-readable or human-readable label.

11. The automated research seed planting system according to claim 10, further comprising a seed package assembly sensor device configured for reading the label of the seed package assembly.

12. The automated research seed planting system according to claim 11, wherein the seed package assembly sensor device comprises a device selected from the group consisting of:
   a bar code reader;
   an OCR reader;
   an RFID reader; and
   combinations thereof.

13. The automated research seed planting system according to claim 1, wherein the planter further comprises a seed metering device configured to receive the research seed sample from the seed package assembly handling device, and wherein the seed metering device is configured to separate individual seeds from the research seed sample and to release the individual seeds into the research plot.

14. The automated research seed planting system according to claim 13, further comprising a seed meter sensor device configured to sense individual seeds as the individual seeds are released into the research plot.

15. The automated research seed planting system according to claim 11, further comprising a positional data acquisition device configured to acquire position data relating to a position of the released research seed sample.

16. The automated research seed planting system according to claim 1, further comprising a positional data acquisition device configured to acquire position data and wherein the controller is configured to control the seed package assembly handling device according to the position data and one or more instruction sets.

17. The automated research seed planting system according to claim 16, wherein one or more instructions sets are derived from one or more research plans.

18. The automated research seed planting system according to claim 17, wherein at least one of the research plans or the instruction sets are stored in at least one data store.

19. The automated research seed planting system according to claim 1, wherein the planter comprises a plurality of seed package assembly handling devices each configured to receive a respective seed package assembly of a plurality of seed package assemblies, and wherein one or more controllers are configured to automatically control each seed package assembly handling device to release a respective research seed sample into the research plot.

20. The automated research seed planting system according to claim 19, wherein the planter further comprises a plurality of seed metering devices each configured to receive a respective research seed sample from a respective seed package assembly handling device, and wherein each seed metering device is further configured to separate individual seeds from the respective research seed sample and to release the individual seeds into the research plot.

21. The automated research seed planting system according to claim 20, further comprising a plurality of seed meter sensor devices configured to sense individual seeds as the individual seeds are released into the research plot.

22. The automated research seed planting system according to claim 19, wherein the planter is configured to plant four rows and comprises four seed package assembly handling devices and four respective seed metering devices, and wherein each seed package assembly handling device is configured to release at least a portion of a respective seed sample into a respective seed metering device.

23. The automated research seed planting system according to claim 19, wherein the planter is configured to plant eight rows and comprises four seed package assembly handling devices, four seed sample splitting devices, and eight seed metering devices, and wherein each seed package assembly handling device is configured to release at least a portion of a respective seed sample into a respective pair of the eight seed metering devices via a respective seed sample splitting device.

24. A method of planting a research plot, said method comprising:
   transporting a planter that comprises a seed package assembly handling device and that receives a seed package assembly containing a research seed sample; and
   controlling the seed package assembly handling device using a controller to automatically release the research seed sample.

25. The method of planting a research plot according to claim 24, further comprising automatically controlling the seed package handling device to apply a force to the seed package assembly to release the research seed sample from the seed package assembly.

26. The method of planting a research plot according to claim 25, wherein the seed package assembly handling device receives a seed package assembly comprising first and second portions that cooperate to contain the research seed sample and wherein applying a force to the seed package assembly causes the first and second portions of the seed package assembly to at least partially separate thus releasing the research seed sample.

27. The method of planting a research plot according to claim 24, further comprising controlling the seed package assembly handling device to bypass releasing the research seed sample from the seed package assembly.

28. The method of planting a research plot according to claim 24, wherein the controller is configured to control the seed package assembly handling device according to one or more instruction sets.

29. The method of planting a research plot according to claim 28, wherein one or more instructions sets are derived from one or more research plans.

30. The method of planting a research plot according to claim 29, wherein at least one of the research plans or the instruction sets are stored in at least one data store.

31. The method of planting a research plot according to claim 26, wherein controlling the seed package assembly handling device comprises controlling the seed package assembly handling device to automatically apply at least a compressive force to the seed package assembly and wherein the compressive force causes at least one of the first or second portions of the seed package assembly to flex outwardly from the other portion about a flexure axis so that the first and second portions at least partially separate in response to the force, thus releasing the research seed sample.

32. The method of planting a research plot according to claim 31, further comprising controlling the seed package assembly handling device using the controller to cause an opening tool to contact between the first and second portions of the seed package assembly and to apply a second force to the package assembly via a disengaging tool for encouraging at least one of the first or second portions to flex outwardly from the other portion about the flexure axis so that the first and second portions separate.

33. The method of planting a research plot according to claim 24, further comprising reading a label on the seed package assembly using a seed package assembly sensor device.

34. The method of planting a research plot according to claim 24, further comprising using a seed metering device to receive the research seed sample from the seed package assembly handling device, separate individual seeds from the research seed sample, and release the individual seeds into the research plot.

35. The method of planting a research plot according to claim 34, further comprising sensing individual seeds using a seed meter sensor device as the individual seeds are released into the research plot.

36. The method of planting a research plot according to claim 33, further comprising using a positional data acquisition device to acquire position data relating to a position of the released research seed sample.

37. The method of planting a research plot according to claim 24 wherein the planter comprises a plurality of seed package assembly handling devices each configured to open a respective seed package assembly of a plurality of seed package assemblies, and wherein controlling the seed package assembly handling device comprises controlling each of the plurality of seed package assembly devices using one or more controllers release the respective research seed sample into the research plot.

38. The method of planting a research plot according to claim 37, further comprising using a plurality of respective seed metering devices to receive the respective research seed samples from the seed package assembly handling devices, separate individual seeds from the research seed samples, and release the individual seeds into the research plot.

39. An automated research seed planting apparatus, the apparatus comprising:
   a seed package assembly handling device configured to receive a seed package assembly containing a research seed sample and to automatically apply a force to the seed package assembly to release the research seed sample from the seed package assembly.

40. The automated research seed planting apparatus according to claim 39, wherein the seed package assembly handling device is configured to open a seed package assembly comprising first and second portions that cooperate to contain the research seed sample, and wherein the seed package assembly handling device is configured to apply a force to the seed package assembly so that the first and second portions of the seed package assembly at least partially separate thus releasing the research seed sample.

41. The automated research seed planting apparatus according to claim 39, wherein the seed package assembly handling device is configured to bypass releasing the research seed sample from the seed package assembly.

42. The automated research seed planting apparatus according to claim 39, wherein the seed package assembly handling device is controlled via a controller.

43. The automated research seed planting apparatus according to claim 42, wherein the seed package assembly handling device is configured to be controlled according to one or more instruction sets.

44. The automated research seed planting apparatus according to claim 43, wherein the one or more instructions sets are derived from one or more research plans.

45. The automated research seed planting apparatus according to claim 43, wherein at least one of the research plans or the instruction sets are stored in at least one data store.

46. The automated research seed planting apparatus according to claim 40, wherein the seed package assembly handling device further comprises an opening tool configured to contact the seed package assembly between the first and second portions and wherein the force comprises a force exerted by the opening tool on the seed package assembly.

47. The automated research seed planting apparatus according to claim 40, wherein the force comprises at least a compressive force and wherein the compressive force causes at least one of the first or second portions of the seed package assembly to flex outwardly from the other portion about a flexure axis so that the first and second portions at least partially separate in response to the force, thus releasing the research seed sample.

48. The automated research seed planting apparatus according to claim 47, wherein the seed package assembly handling device further comprises an opening tool and a disengaging tool, and wherein the opening tool is configured to contact the seed package assembly between the first and second portions of the seed package assembly so as to apply a second force to the seed package assembly and the disengaging tool is configured to apply a third force to the seed package assembly, and wherein the compressive force and the second and third forces encourage at least one of the first or second portions to flex outwardly from the other portion about the flexure axis so that the first and second portions separate.

49. The automated research seed planting apparatus according to claim 39, further comprising a seed package assembly sensor device configured for reading a label of the seed package assembly.

50. The automated research seed planting apparatus according to claim 49, wherein the seed package assembly sensor device comprises a device selected from the group consisting of:
   a bar code reader;
   an OCR reader;
   an RFID reader; and
   combinations thereof.

51. The automated research seed planting apparatus according to claim 39, further comprising a seed metering device configured to receive the research seed sample from the seed package assembly handling device, and wherein the seed metering device is configured to separate individual seeds from the research seed sample and to release the individual seeds into the research plot.

52. The automated research seed planting apparatus according to claim 51, further comprising a seed meter sensor device configured to sense individual seeds as the individual seeds are released into the research plot.

53. The automated research seed planting apparatus according to claim 49, further comprising a positional data acquisition device configured to acquire position data relating to a position of the released research seed sample.

54. The automated research seed planting apparatus according to claim 39, further comprising a positional data acquisition device configured to acquire position data and wherein the seed package assembly handling device is configured to operate according to the position data and one or more instruction sets.

55. The automated research seed planting apparatus of claim 39, further comprising a seed sample splitting device configured to receive the research seed sample from the seed package assembly handling device.

* * * * *